United States Patent
Langley et al.

(10) Patent No.: US 12,168,199 B2
(45) Date of Patent: Dec. 17, 2024

(54) METHOD OF FORMING A PD—AU ALLOY LAYER ON A SUBSTRATE

(71) Applicant: COMMONWEALTH SCIENTIFIC AND INDUSTRIAL RESEARCH ORGANISATION, Acton (AU)

(72) Inventors: Matthew Langley, Pullenvale (AU); David Viano, Pullenvale (AU); Michael Dolan, Pullenvale (AU)

(73) Assignee: Commonwealth Scientific and Industrial Research Organisation, Acton (AU)

( * ) Notice: Subject to any disclaimer, the term of this patent is extended or adjusted under 35 U.S.C. 154(b) by 0 days.

(21) Appl. No.: 17/856,534

(22) Filed: Jul. 1, 2022

(65) Prior Publication Data

US 2022/0403541 A1 Dec. 22, 2022

Related U.S. Application Data

(63) Continuation of application No. 16/306,748, filed as application No. PCT/AU2017/050554 on Jun. 6, 2017, now abandoned.

(30) Foreign Application Priority Data

Jun. 6, 2016 (AU) .................................. 2016902188

(51) Int. Cl.
*B01D 53/22* (2006.01)
*B01D 67/00* (2006.01)
(Continued)

(52) U.S. Cl.
CPC ....... *B01D 53/228* (2013.01); *B01D 67/0069* (2013.01); *B01D 69/04* (2013.01);
(Continued)

(58) Field of Classification Search
None
See application file for complete search history.

(56) References Cited

U.S. PATENT DOCUMENTS 3,350,845 A * 11/1967 McKinley ............... C01B 3/505
 95/56
3,350,846 A * 11/1967 Makrides ................ C01B 3/505
 95/56

(Continued)

FOREIGN PATENT DOCUMENTS

CN 102677110 9/2012
EP 0 225 422 A1 6/1987
(Continued)

OTHER PUBLICATIONS

Raub, Ch. J., "Electroplating of Palladium for Electrical Contacts", Platinum Metals Rev., 1982, 26, (4), pp. 158-166. (Year: 1982).*

(Continued)

*Primary Examiner* — Jason M Greene
(74) *Attorney, Agent, or Firm* — Foley & Lardner LLP

(57) ABSTRACT

A method for preparing a palladium-gold alloy layer on a substrate by electrodepositing said coating surface with an aqueous electroplating solution comprising of an aqueous solution of a soluble palladium compound and a soluble gold complex, wherein the ratio of gold to palladium to in the solution is from 5 to 40 w/w %. Also taught is a substrate such as a vanadium or vanadium alloy gas separation membrane coated with a palladium-gold alloy layer.

17 Claims, 14 Drawing Sheets

(51) Int. Cl.
  *B01D 69/04* (2006.01)
  *B01D 71/02* (2006.01)
  *C25D 3/56* (2006.01)
  *C25D 5/34* (2006.01)
  *C25D 7/04* (2006.01)

(52) U.S. Cl.
  CPC ... *B01D 71/0221* (2022.08); *B01D 71/02231* (2022.08); *C25D 3/567* (2013.01); *C25D 5/34* (2013.01); *C25D 7/04* (2013.01)

(56) References Cited

U.S. PATENT DOCUMENTS

| | | | |
|---|---|---|---|
| 5,149,420 A * | 9/1992 | Buxbaum | C25D 5/38 205/265 |
| 5,215,729 A * | 6/1993 | Buxbaum | B01D 71/022 95/56 |
| 5,552,031 A * | 9/1996 | Moon | C25D 3/567 205/255 |
| 6,379,524 B1 | 4/2002 | Lee et al. | |
| 8,721,773 B2 | 5/2014 | Perkins et al. | |
| 2008/0073218 A1 | 3/2008 | Ishikawa et al. | |
| 2009/0038950 A1 | 2/2009 | Zhang-Beglinger et al. | |
| 2013/0104740 A1 | 5/2013 | Perkins et al. | |
| 2013/0122187 A1 | 5/2013 | Saukaitis | |
| 2015/0368762 A1 | 12/2015 | Liang et al. | |

FOREIGN PATENT DOCUMENTS

| | | |
|---|---|---|
| JP | 2003-320226 | 11/2003 |
| JP | 2008-034293 | 2/2008 |
| JP | 2008-081765 | 4/2008 |
| JP | 2010-084178 | 4/2010 |

OTHER PUBLICATIONS

"Adhesion Testing on Steel", http://www.paintsquare.com/library/articles/Applicator_Training_Bulletin_Adhesion_Testing_on_Steel.p df>, Applicator Training Bulletin, JPCL, Jan. 2001, PCE, pp. 43-46.
Final Office Action on U.S. Appl. No. 16/306,748 dtd Jan. 6, 2022.
Final Office Action on U.S. Appl. No. 16/306,748 dtd May 13, 2021.
Gabitto, Jorge F. et al., "Sulfur Poisoning of Metal Membranes for Hydrogen Separation", International Review of Chemical Engineering (I.RE.CH.E.), vol. 1, N. 5, Sep. 2009, pp. 394-411.
Heydari, H., et al., "Electrodeposition and characterization of palladium nanostructures on stainless steel and application as hydrogen sensor," Ciencia e Natura, 37(1):23-33 (2015) (11 pages).
International Preliminary Report on Patentability on PCT/AU2017/050554, dated Oct. 5, 2018, 20 pages.
International Search Report and Written Opinion on PCT/AU2017/050554, dated Aug. 2, 2017, 13 pages.
Non-Final Office Action on U.S. Appl. No. 16/306,748 dtd Feb. 2, 2021.
Non-Final Office Action on U.S. Appl. No. 16/306,748 dtd Sep. 16, 2021.
Non-Final Office Action on U.S. Appl. No. 16/306,748 dtd Oct. 29, 2020.
Notice of Reasons for Rejection in JP Patent Application No. 2019-516033 dated Feb. 15, 2021 (with English translation) (12 pages).
Raub, CH. J., "Electroplating of Palladium for Electrical Contacts," Platinum Metals Rev., 26(4):158-166 (1982) (9 pages).
Shi, Lihua et al., "One-step synthesis of Au—Pd alloy nanodendrites and their catalytic activity." The Journal of Physical Chemistry C, vol. 117, 2013, pp. 12526-12536.

* cited by examiner

PGA_047

PGA_048

PGA_049

PGA_050

PGA_051

PGA_052

METHOD OF FORMING A PD—AU ALLOY LAYER ON A SUBSTRATE

CROSS-REFERENCE TO RELATED APPLICATIONS

The present application is a continuation of U.S. patent application Ser. No. 16/306,748, filed Dec. 3, 2018, which is the U.S. National Stage of International Application PCT/AU2017/050554, filed Jun. 6, 2017, and claims priority to Australian Patent Application No. 2016902188, filed Jun. 6, 2016.

TECHNICAL FIELD

The present invention generally relates to a method of forming a Pd—Au alloy layer or layers on a substrate. The invention is particularly applicable to forming a catalytic, sulfur tolerant layer on the surface of a vanadium or vanadium alloy membrane and it will be convenient to hereinafter disclose the invention in relation to that exemplary application. However, it is to be appreciated that the invention is not limited to that application and could be applied as an alloy layer to a variety of metallic substrates.

BACKGROUND OF THE INVENTION

The following discussion of the background to the invention is intended to facilitate an understanding of the invention. However, it should be appreciated that the discussion is not an acknowledgement or admission that any of the material referred to was published, known or part of the common general knowledge as at the priority date of the application.

Hydrogen ($H_2$) does not occur naturally in great abundance, and in industrial practice it is produced by the conversion of a hydrocarbon fuel such as coal, petroleum or natural gas, or through the decomposition of ammonia ($NH_3$). Each of these production routes produces an impure gas stream containing $H_2$ plus unreacted feed gases (e.g., $CH_4$, $H_2O$, $NH_3$) and by-products such as $CO_2$, CO and $N_2$. For many applications, the $H_2$ must be separated from this mixed gas stream.

Membrane-based separation technology is currently under development for the separation of $H_2$ from mixed gas streams. Broadly speaking, a membrane is a near two-dimensional structure which is selectively permeable to one species. In the context of gas separation, a membrane allows one species to selectively permeate (usually $H_2$), while blocking other species (e.g. CO, $CO_2$, $H_2O$, $N_2$, $H_2S$ etc.). Hydrogen-selective membranes can be created from inorganic, metallic or ceramic materials, each of which has characteristic hydrogen throughputs, operating temperatures and selectivity.

A catalytic membrane reactor (CMR) integrates a hydrogen selective membrane with a water gas shift catalyst, thereby enabling the production and separation of $H_2$. CMRs typically operate at temperatures up to 450° C. for favourable fast kinetics for the WGS reaction and temperatures up to 600° C. for a methane reforming reactor. Furthermore, the CMR allows greater-than-equilibrium conversion to be attained, as the continuous depletion of the $H_2$ product through the membrane pushes the WGS reaction to the product side. The continuous extraction of $H_2$ in situ can allow CO conversions of almost 100%.

Palladium is the best known membrane material, having an ability to permeate hydrogen between 300 to 600° C. whilst being tolerant to syngas species such as CO and $H_2O$. However, the high cost of palladium (545 USD/oz (2016)), has driven research towards minimising its consumption, most notably through alloying with less-expensive metals, and minimising thickness by depositing very thin (<5 μm) layers on support structures with very fine pores.

A number of other metals exhibit very high hydrogen permeability, most notably vanadium, titanium, tantalum and zirconium. At 350° C., the hydrogen permeability of these metals is around two orders of magnitude greater than palladium, and the raw materials prices are significantly lower. Of these metals, V has the widest alloying range, which means it has the widest scope for modifying the alloy properties to meet the demands of a hydrogen separation membrane. One example of Vanadium based membranes used in a CMR is taught in the Applicant's United States patent publication No. US20150368762A1.

It is desirable to coat vanadium and vanadium-based membranes with a catalytic coating, such as palladium, to enhance the functionality of the membrane, for example species selectivity. However, palladium has poor chemical stability in the presence of impurities and in particular is susceptible to poisoning by hydrogen sulfide. Sulfur is one of the major impurities in fossil fuels and biomass, especially in coal. $H_2S$ is therefore a common impurity in hydrocarbon-derived gas streams. Even a small quantity of $H_2S$ (a few ppm) could cause a large decrease in hydrogen permeance of a Pd foil. $H_2S$ binds with Pd to form a $Pd_4S$ layer inhibiting Pd permeability.

One approach to enhance the sulfur resistance of Pd is to alloy Pd with other elements such as copper, silver and gold, for example as disclosed in U.S. Pat. No. 3,350,845, which were found to have improved resistance to poisoning by hydrogen sulfide. Palladium-gold alloys have been found to be particularly effective.

Pd—Au alloy layers have conventionally been formed using a two-step deposition method whereby palladium and gold layers are separately deposited onto a substrate and that bilayer structure is then heat treated to create a homogeneous alloy layer. An example of this technique is taught in U.S. Pat. No. 8,721,773, which teaches that a gold-palladium alloy membrane can be deposited on a porous substrate coated with intermetallic diffusion. In the method, one or more layers of palladium are deposited on the coated porous substrate using electroless plating. That deposited palladium layer is then abraded to increase surface roughness of the palladium to a mean surface roughness (Sa) above 0.8 micron up to 2.5 microns, gold is then deposited on the abraded palladium layer by electroless plating employing a plating solution consisting essentially of chloroauric acid and hydrogen peroxide. The layers are then annealed at a temperature in the range of from 500° C. to 550° C. in a hydrogen or inert gas atmosphere to produce a palladium-gold alloy membrane.

However, the existing annealing deposition method is not suitable for vanadium based membranes as the palladium and gold layers substantially diffuse into the vanadium or vanadium alloy substrate during the annealing stage. The resulting surface is significantly less permeable to hydrogen than a palladium surface.

A variety of plating solutions have also been previously used to electroplate or electrodeposit a palladium-gold alloy on substrates which utilise additional coordination agents or complexing agents to stabilise the components of the plating solution to remain in solution. Examples include:

United States Patent Publication No. 2008/0073218A1 which teaches a plating solution of palladium alloy containing a palladium complex and a metal salt and at least one neutral amino acid coordination/complexing agent selected from glycine, alanine, valine, leucine, serine, threonine, asparagine, glutamine and tyrosine as a ligand.

U.S. Pat. No. 5,552,031A which teaches a palladium alloy plating composition comprising 4 to 20 g/l of palladium ion, 0.3 to 2.0 g/l of gold ion, 5 to 100 g/l of a conductive salt and 0.5 to 20 g/l of a complexing agent selected from 4-oxopentanoic acid, and benzaldehyde tristyrilphenate, and optionally 0.3 to 5 g/l of an alloying metal ion. The complexing agents are selected to form a stable complex of the metals to be alloyed, to thereby provide a stable plating composition.

Nevertheless, the use of complexing agents and/or coordinating agents and other additional components can add unwanted impurities and/or contamination on the deposited Pd—Au surface.

It would therefore be desirable to provide an alternate method of depositing palladium-gold alloy layers onto vanadium based substrates, such as vanadium based membranes.

SUMMARY OF THE INVENTION

A first aspect of the present invention provides a method for preparing a palladium-gold alloy layer on a substrate comprising:
  providing a substrate having a coating surface; and
  electrodepositing said coating surface with an aqueous electroplating solution comprising a soluble palladium compound and a soluble gold complex, wherein the ratio of gold to palladium to in the solution is from 5 to 40 w/w % for a period of time sufficient to deposit a layer of palladium-gold alloy on the coating surface.

This first aspect of the present invention provides a method of forming a sulfur-tolerant Pd—Au alloy layer or layers on substrate, for example a vanadium or vanadium alloy membrane, using a single deposition step. As discussed in the background, this has been previously achieved using at least two separate deposition steps whereby palladium and gold layers are separately deposited onto a surface, and that bilayer structure is then heat treating them to create a homogeneous alloy layer. The present invention significantly simplifies processing from previously known methods because the requisite layer can be formed in a single deposition process. The use of a single deposition process also provides better control of the final composition and properties of the deposited Pd—Au layer.

Furthermore, a new electrolytic solution for aqueous electroplating solution is used to form the palladium-gold alloy coating on the substrate, where the major metallic component is palladium (greater than 60 at %), and the alloying component is gold. Advantageously, the use of a gold complex allows the solution to be stable, with both aqueous metallic components remaining in solution. Furthermore, this combination surprisingly results in bringing the plating potential of each metal sufficiently close together so that a single potential is capable of simultaneous deposition of both the palladium and gold metals to form alloy deposits.

Applicant considers that the formation of a sulfur-tolerant Pd—Au alloy layer or layers on a substrate, such as a vanadium or vanadium alloy membrane, using a simplified process has been long desired. However, no person skilled in the art has managed to produce a stable electroplating solution that allows a sulfur-tolerant Pd—Au alloy layer or layers to be deposited on a vanadium or vanadium alloy substrate in a single deposition step. All other electroplating solutions have either included a number of undesirable additional components, such as complexing agents or co-ordination agents used to stabilise the combination of components, or have not had sufficient component stability.

The composition of the Pd—Au alloy deposited on the coating surface can be tailored by varying the proportions of Pd and Au precursors in solution. The w/w % ratio of gold to palladium in the solution is has more palladium than gold, typically ranging from 5 to 40%. In embodiments, the w/w % ratio of gold to palladium in the solution is from 5 to 40%, preferably from 8 to 30%, more preferably from 10 to 30%, yet more preferably from 20 to 23%. It should be appreciated that other factors can affect the composition of the Pd—Au alloy including plating bath temperature, pH, rotation speed, concentration or the like as will be discussed in more detail below.

The concentration of Au in the aqueous electroplating solution can range from 4 to 30 wt %, preferably from 5 to 25 wt %, more preferably from 20 to 25 wt %. In some embodiments, the concentration of Au in the aqueous electroplating solution is preferably from 10 to 25 wt %, preferably from 22 to 23 wt %.

The form in which palladium can be added to the solution can be one or more of a number of suitable palladium compounds. However, the palladium preferably must remain soluble in the electroplating solution and must not cause precipitation. Examples of compounds that can be employed in the solutions include palladium diamino dinitrite (P-salt), palladium nitrate, palladium sulfate, palladium phosphate, a palladium organo sulfonate or a palladium organo phosphonate.

The gold compound used in the electroplating solution must be a gold complex. Again the use of a gold complex allows the solution to be stable, with both aqueous metallic components remaining in solution. In embodiments, the gold complex may comprise sodium gold cyanide (NaAu(CN)$_2$) or potassium gold cyanide (KAu(CN)$_2$). In preferred embodiments, the gold complex comprises potassium gold cyanide.

$H_2$ permeability increases with higher surface area, rough surface finishes. It therefore preferred for the Pd—Au plated coating to have a higher surface texture and/or roughness. The shade or light reflectivity of provides an indication of the roughness of the Pd—Au plated coating. A lightness parameter L of the Pd—Au plated coating can be measured using a Chroma Meter such as Konica Minolta CR-400 Chroma Meter or a HunterLab MiniScan EZ (using 45°/0° geometry). It should be appreciated that lightness L is a parameter that describes the lightness of a sample, where something with a lightness of 100 represents lightest of whites and a lightness of 0 represents the darkest of blacks. The plated Pd—Au preferably has a lightness L of less than 50. In preferred embodiments, the lightness is preferably less than 45, more preferably less than 40, yet more preferably less than 35. In some embodiments, the lightness is less than 30. In particular embodiments, the lightness is between 15 and 50, preferably between 20 and 40.

The morphology of the Pd—Au plated coating can also have an effect on the surface texture or roughness of that coating. In some embodiments, the palladium-gold alloy layer has a bulbous and/or cauliflower shaped morphology. The formation of this cauliflower shaped morphology is unexpected, and advantageously enhances the surface texture and/or roughness of the Pd—Au plated coating.

The substrate can comprise any suitable substrate on which a Pd—Au layer is required to be plated. In embodiments, the substrate is preferably metallic. In some embodiments, the substrate comprises a vanadium or vanadium alloy substrate. The vanadium or vanadium alloy substrate can comprise any desired substrate onto which the Pd—Au coating can be applied. In embodiments, the vanadium or vanadium alloy substrate comprises vanadium or a vanadium alloy based gas separation membrane. Again, one set of suitable vanadium alloy substrates can be formed from the vanadium alloys taught in the Applicant's patent publication No. US20150368762A1, the contents of which again should be understood to be incorporated into this specification by this reference.

The substrate can take any suitable form. In some embodiments, the substrate comprises a planar body. In other embodiments, the substrate comprises a tubular substrate. Where the substrate is tubular, it is preferred that the tubular body is continuously rotated within the electroplating solution, preferably at a constant speed. This enables an even alloy coating to be deposited on the coating surface. Any suitable rotational speed can be used. In some embodiments, the rotational speed is from 20 to 200 RPM, preferably from 30 to 150 RPM, more preferably from 50 to 125 RPM, yet more preferably from 50 to 100 RPM.

As noted above, other factors can affect the composition and/or morphology of the Pd—Au alloy including plating bath temperature, pH, current density or the like. In some embodiments, the electrodepositing step is conducted at a plating temperature of from 10 and 60° C., preferably from 20 to 50° C., more preferably from 25 to 50° C., yet more preferably from 30 to 50° C., yet more preferably about 50° C. In some embodiments, the electrodepositing step is conducted at a pH of between 8 and 9, preferably from 8 to 8.7, more preferably from 8.4 to 8.7. In some embodiments, the electrodepositing step is conducted at a pH of around 8.5. In some embodiments, the electrodepositing step is conducted using a current density of from 1 to $10 \times 10^{-2}$ A/cm$^2$, preferably from 3 to $7 \times 10^{-2}$ A/cm$^2$, more preferably from 3 to $5 \times 10^{-2}$ A/cm$^2$. In some embodiments, the electrodepositing step is conducted using a current density of from 4 to $10 \times 10^{-2}$ A/cm$^2$, and preferably from 4 to $5 \times 10^{-2}$ A/cm$^2$.

One of the advantages of the present invention is that a thin layer of Pd—Au alloy can be deposited on the surface of the coating surface. For example, in some embodiments the palladium-gold alloy has a thickness of between 100 nm and 5 microns. In some embodiments, the palladium-gold alloy has a thickness of from 100 nm and 1 micron. In embodiments, the palladium-gold alloy has a thickness of 200 to 500 nm, preferably 250 to 500 nm on the outer surface of the vanadium or vanadium alloy substrate. It should be appreciated that the thickness of the Pd—Au alloy layer depends in some part on the surface roughness of the coating surface on which the Pd—Au alloy is deposited. The higher the surface roughness, the thicker the Pd—Au alloy layer required to ensure the integrity of coverage of the layer.

The deposited Pd—Au alloy preferably has a high purity. In some embodiments, the palladium-gold alloy has a purity of at least 99.9%, more preferably at least 99.99%.

It is noted that the period of time sufficient to deposit a layer of palladium-gold alloy on the coating surface relates to surface coverage of the coating surface with the desired thickness of palladium-gold alloy. It should be appreciated that that time depends on the size of the coating surface, and electrodeposition factors including current density, temperature, concentration and w/w % ratio of gold to palladium in the electroplating solution. However, it should be appreciated that sufficient time must be spent to provide full surface coating of the desired thickness of the entire coating surface.

The composition of the Pd—Au alloy deposited on the coating surface can be tailored by varying the proportions of Pd and Au precursors in solution as discussed above. In embodiments, the palladium-gold alloy layer has a composition of from $Pd_{60}Au_{40}$ to $Pd_{95}Au_5$, preferably from $Pd_{70}Au_{30}$ to $Pd_{90}Au_{10}$, more preferably from $Pd_{70}Au_{30}$ to $Pd_{75}Au_{25}$, and yet more preferably about $Pd_{70}Au_{30}$ at %.

The visual appearance of the Pd—Au alloy coating deposited on the coating surface preferably has a shiny/mirror appearance indicating a low surface area and low surface roughness or has a coating having a dark and dull appearance indicates that the coating is a rough layer with a high surface area. In comparison, a coating having a dull, powdery appearance is therefore not plated or adhered correctly to the coating surface.

The Pd—Au alloy coating deposited on the coating surface preferably has good adherence to the coating surface. In embodiments, adherence to the coating surface can be tested in accordance to ASTM D3359-97: Standard Test Methods for Measuring Adhesion by Tape Test. The Pd—Au alloy coating deposited on the coating surface preferably has a 5A classification in accordance to ASTM D3359-97.

Where the substrate comprises a vanadium or vanadium alloy substrate, the coated vanadium or vanadium alloy substrate preferably has a hydrogen permeability of 1 to $2.5 \times 10^{-7}$ mol/m/s/Pa$^{0.5}$ at temperatures between 325 to 350° C., preferably 1 to $2.5 \times 10^{-7}$ mol/m/s/Pa$^{0.5}$ at temperatures between 325 to 350° C., more preferably 2 to $2.5 \times 10^{-7}$ mol/m/s/Pa$^{0.5}$ at temperatures between 325 to 350° C. The coated vanadium or vanadium alloy substrate preferably has a steady state H$_2$ permeability in 20 ppm H$_2$S (i.e. the gas stream includes 20 ppm H$_2$S) of 1 to $50 \times 10^{-8}$ mol/m/s/Pa$^{0.5}$ at temperatures between 325 to 350° C., preferably 1 to $20 \times 10^{-8}$ mol/m/s/Pa$^{0.5}$ at temperatures between 325 to 350° C., more preferably 1 to $15 \times 10^{-7}$ mol/m/s/Pa$^{0.5}$ at temperatures between 325 to 350° C. In embodiments, The coated vanadium or vanadium alloy substrate preferably has a steady state H$_2$ permeability in 20 ppm H$_2$S (i.e. the gas stream includes 20 ppm H$_2$S) of 5 to $50 \times 10^{-8}$ mol/m/s/Pa$^{0.5}$ at temperatures between 325 to 350° C., preferably 15 to $50 \times 10^{-8}$ mol/m/s/Pa$^{0.5}$ at temperatures between 325 to 350° C., more preferably 1 to $5 \times 10^{-7}$ mol/m/s/Pa$^{0.5}$ at temperatures between 325 to 350° C.

The coating surface is preferably undergoes a cleaning procedure prior to the electrodepositing step. In this respect, the surface should preferably be free of any oils and oxide layers to enable good adhesion of the alloy layer during electroplating. In embodiments, the coating surface undergoes at least one of and preferably all of the following:
   Washing using a suitable solvent, such as isopropanol, and preferably ultrasonic agitation in that solvent;
   mechanical cleaning such as including abrasive contact, mechanical buffing, brushing, scraping, sanding or the like; or
   Chemical etching, preferably acidic etching, more preferably cathodic acid etching, for example cathodic etching using hydrofluoric acid.

It should be appreciated that the cleaning steps can be interspersed between or with one or more washing procedures, where a solvent or other washing fluid, such as water, preferably deionised water and/or an alcohol, such as isopropanol, is used to wash the coating surface of the substrate between cleaning procedures.

The mechanical cleaning step can include any number of processes. In some embodiments, the coating surface is cleaned or otherwise contacted with an abrasive tool such as a brush or scrubber, preferably using with fluid flushing such as deionized water.

In some embodiments, the mechanical cleaning step includes abrading said coating surface with an abrasion media. Various abrasion media can be used, such as an abrasive body such a sand paper or other gritted paper. In some embodiments, the coating surface is abraded with an abrasion media having a particle size of from 1 to 10 microns. The abrasion process preferably increases the surface roughness of the coating surface. For example, in some forms the coating surface has a mean surface roughness (Sa) of less than 0.8 micron prior to the abrasion step or process. In some embodiments, the coating surface is abraded with an abrasion media to increase the surface roughness to a mean surface roughness (Sa) above 0.8 micron up to 2.5 microns. In some embodiments, the coating surface is abraded to a mean surface roughness (Sa) between 0.85 micron and 1.5 microns, preferably between 0.9 micron and 1.2 microns prior to contacting with said solution. It should be appreciated that the mean surface roughness can be measured using several techniques. In this specification, mean surface roughness (Sa) is indicated to mean surface roughness measured using a profilometer, for example a Nanovea Profilometer.

Chemical etching typically involves an electrolytic cleaning method utilizing a dilute acidic solution, for example 5 to 15%, preferably about 10% aqueous acid solution can be applied to the surface. It should be appreciated that the concentration of the acid depends on the type of acid used. Furthermore, the selection of the acid will depend on the composition of the substrate surface. In embodiments, the acid can be selected from sulfuric or hydrofluoric acid. For vanadium and vanadium alloy surfaces, hydrofluoric acid is preferably used.

A second aspect of the present invention provides a method of preparing a palladium-gold alloy gas separation membrane system, which method comprises:

providing a vanadium or vanadium alloy substrate having an coating surface;

abrading said coating surface to a mean surface roughness (Sa) of above 0.8 microns up to 2.5 microns; and electrodepositing said coating surface with a aqueous electroplating solution comprising a soluble palladium compound and a soluble gold complex, wherein the ratio of gold to palladium to in the solution is from 5 to 40 w/w % for a period of time sufficient to deposit a layer of palladium-gold alloy on the coating surface.

The Pd—Au coating or layer should preferably be deposited on the vanadium based substrate within a short time of cleaning in order to deposit the coating on a clean and non-oxidised surface. Typically, the Pd—Au coating or layer would be deposited on the coating surface of the substrate in less than 5 minutes of cleaning, preferably less than 2 minutes, and more preferably in less than 1 minute. This prevents significant oxidation of the coating surface prior to surface treatment/coating deposition.

After cleaning the vanadium based substrate is then immersed in the electroplating solution. Where the substrate comprises a tubular substrate, it is preferred that the tubular substrate is continuously rotated within the electroplating solution to produce an even coating thereon. Preferably, said rotation is at a constant or even speed. Preferably, the electroplating solution is agitated to minimise any concentration gradients of plating precursors. It should be appreciated that rotation of the tubular substrate can provide the required agitation.

The present invention also relates to a gas separation membrane system prepared by the method of according to the first or second aspects of the present invention.

A third aspect of the present invention provides a palladium-gold alloy coated substrate, including a palladium-gold alloy coating having a thickness of between 100 nm and 5 microns and having a composition of from $Pd_{60}Au_{40}$ to $Pd_{95}Au_5$.

In embodiments, the palladium-gold alloy coating has a thickness of from 100 nm and 1 microns, preferably from 200 to 500 nm. Moreover, the palladium-gold alloy coating preferably has a composition of from $Pd_{60}Au_{40}$ to $Pd_{95}Au_5$, more preferably from $Pd_{70}Au_{30}$ to $Pd_{90}Au_{10}$, yet more preferably from $Pd_{70}Au_{30}$ to $Pd_{75}Au_{25}$, and yet more preferably about $Pd_{70}Au_{30}$ at %.

In embodiments, the Pd—Au alloy coating has a 5A classification in accordance to ASTM D3359-97.

It therefore preferred for the Pd—Au plated coating to have a higher surface texture and/or roughness. The shade or light reflectivity of provides an indication of the roughness of the Pd—Au plated coating. That lightness of the Pd—Au plated coating can be measured using a Chroma Meter such as Konica Minolta CR-400 Chroma Meter or a HunterLab MiniScan EZ (using 45°/0° geometry). The plated Pd—Au preferably has a lightness L of less than 50. In preferred embodiments, the lightness is preferably less than 45, more preferably less than 40, yet more preferably less than 35. In some embodiments, the lightness is less than 30. In particular embodiments, the lightness is between 15 and 50, preferably between 20 and 40.

The Pd—Au alloy coating preferably has a high purity. In some embodiments, the palladium-gold alloy has a purity of at least 99.9%, more preferably at least 99.99%.

The morphology of the Pd—Au plated coating can also have an effect on the surface texture or roughness of that coating. In some embodiments, the palladium-gold alloy layer has a bulbous and/or cauliflower shaped morphology. This morphology enhances the surface texture and/or roughness of the Pd—Au plated coating.

Any suitable substrate, preferably metallic substrate can be used. In embodiments, the substrate comprises a vanadium or vanadium alloy substrate. In preferred embodiments, the substrate comprises a vanadium or vanadium alloy membrane, preferably a vanadium or a vanadium alloy based gas separation membrane. In embodiments, the vanadium or vanadium alloy substrate comprises a tubular substrate.

Where the substrate comprises a gas separation membrane, that gas separation membrane preferably has a hydrogen permeability of 1 to $2.5 \times 10^{-7}$ mol/m/s/$Pa^{0.5}$ at temperatures between 325 to 350° C., preferably 1.5 to $2.5 \times 10^{-7}$ mol/m/s/$Pa^{0.5}$ at temperatures between 325 to 350° C., more preferably 2 to $2.5 \times 10^{-7}$ mol/m/s/$Pa^{0.5}$ at temperatures between 325 to 350° C. The gas separation membrane may also preferably have a steady state $H_2$ permeability in 20 ppm $H_2S$ (i.e. the gas stream includes 20 ppm $H_2S$) of 1 to $50 \times 10^{-8}$ mol/m/s/$Pa^{0.5}$ at temperatures between 325 to 350° C., preferably 1 to $20 \times 10^{-8}$ mol/m/s/$Pa^{0.5}$ at temperatures between 325 to 350° C., more preferably 1 to $15 \times 10^{-7}$ mol/m/s/$Pa^{0.5}$ at temperatures between 325 to 350° C. In embodiments, The coated vanadium or vanadium alloy substrate preferably has a steady state $H_2$ permeability in 20 ppm $H_2S$ (i.e. the gas stream includes 20 ppm $H_2S$) of 5 to $50 \times 10^{-8}$ mol/m/s/$Pa^{0.5}$ at temperatures between 325 to 350° C., preferably 15 to $50 \times 10^{-8}$ mol/m/s/$Pa^{0.5}$ at temperatures between 325 to 350° C., more preferably 1 to $5 \times 10^{-7}$ mol/m/s/$Pa^{0.5}$ at temperatures between 325 to 350° C.

A fourth aspect of the present invention provides a gas separation membrane comprising a vanadium or vanadium alloy substrate having a palladium-gold alloy coating thereon and having a thickness of between 100 nm and 5 microns having a composition of from $Pd_{60}Au_{40}$ to $Pd_{95}Au_5$.

In embodiments, the palladium-gold alloy coating has a thickness of from 100 nm and 1 microns, preferably from 200 to 500 nm. Moreover, the palladium-gold alloy coating preferably has a composition of from $Pd_{60}Au_{40}$ to $Pd_{95}Au_5$, more preferably from $Pd_{70}Au_{30}$ to $Pd_{90}Au_{10}$, yet more preferably from $Pd_{70}Au_{30}$ to $Pd_{75}Au_{25}$, and yet more preferably about $Pd_{70}Au_{30}$ at %.

In embodiments, the Pd—Au alloy coating has a 5A classification in accordance to ASTM D3359-97.

$H_2$ permeability increases with higher surface area, rough surface finishes. It therefore preferred for the Pd—Au plated coating to have a higher surface texture and/or roughness. The shade or light reflectivity of provides an indication of the roughness of the Pd—Au plated coating. That lightness of the Pd—Au plated coating can be measured using a Chroma Meter such as Konica Minolta CR-400 Chroma Meter or a HunterLab MiniScan EZ (using 45°/0° geometry). The plated Pd—Au preferably has a lightness L of less than 50. In preferred embodiments, the lightness is preferably less than 45, more preferably less than 40, yet more preferably less than 35. In some embodiments, the lightness is less than 30. In particular embodiments, the lightness is between 15 and 50, preferably between 20 and 40.

The Pd—Au alloy coating preferably has a high purity. In some embodiments, the palladium-gold alloy has a purity of at least 99.9%, more preferably at least 99.99%.

The morphology of the Pd—Au plated coating can also have an effect on the surface texture or roughness of that coating. In some embodiments, the palladium-gold alloy layer has a bulbous and/or cauliflower shaped morphology. This morphology enhances the surface texture and/or roughness of the Pd—Au plated coating.

The gas separation membrane preferably has a hydrogen permeability of 1 to $2.5 \times 10^{-7}$ mol/m/s/$Pa^{0.5}$ at temperatures between 325 to 350° C., preferably 1.5 to $2.5 \times 10^{-7}$ mol/m/s/$Pa^{0.5}$ at temperatures between 325 to 350° C., more preferably 2 to $2.5 \times 10^{-7}$ mol/m/s/$Pa^{0.5}$ at temperatures between 325 to 350° C.

The gas separation membrane preferably has a steady state $H_2$ permeability in 20 ppm $H_2S$ (i.e. the gas stream includes 20 ppm $H_2S$) of 1 to $50 \times 10^{-8}$ mol/m/s/$Pa^{0.5}$ at temperatures between 325 to 350° C., preferably 1 to $20 \times 10^{-8}$ mol/m/s/$Pa^{0.5}$ at temperatures between 325 to 350° C., more preferably 1 to $15 \times 10^{-7}$ mol/m/s/$Pa^{0.5}$ at temperatures between 325 to 350° C. In embodiments, The coated vanadium or vanadium alloy substrate preferably has a steady state $H_2$ permeability in 20 ppm $H_2S$ (i.e. the gas stream includes 20 ppm $H_2S$) of 5 to $50 \times 10^{-8}$ mol/m/s/$Pa^{0.5}$ at temperatures between 325 to 350° C., preferably 15 to $50 \times 10^{-8}$ mol/m/s/$Pa^{0.5}$ at temperatures between 325 to 350° C., more preferably 1 to $5 \times 10^{-7}$ mol/m/s/$Pa^{0.5}$ at temperatures between 325 to 350° C.

The vanadium or vanadium alloy substrate can have any suitable shape and configuration. In embodiments, the vanadium or vanadium alloy substrate comprises a tubular substrate.

A fifth aspect of the present invention provides a process of producing a tubular membrane comprising:
  forming a thin-walled vanadium alloy tube; and
  coating the thin-walled vanadium alloy tube with a Pd—Au coating using the method of the second aspect of the present invention.

The tubular membranes can have any suitable dimensions as described above. In some embodiments, the thin-walled tube comprises a tube having an outer diameter of between 2 to 25 mm, preferably between 3 and 20 mm and a wall thickness of from 0.05 to 1 mm, preferably from 0.1 to 0.5 mm, as discussed in more detail below.

It should be appreciated that tube production is a multi-step process, first involving the production of rods with the desired composition, microstructure and dimensions, followed by deformation of these rods into the desired final shape. Any suitable deformation process can be used, including drawing, rolling, extrusion casting, rod casting or a combination thereof can be used to form the tubes.

A sixth aspect of the present invention provides a tubular membrane for a catalytic membrane reactor formed from the process according to the fifth aspect of the present invention.

It should be appreciated that in other embodiments, the tubular membrane can be used for any hydrogen separation application, including separation only or catalytic membrane reactor applications.

A seventh aspect of the present invention provides a catalytic membrane reactor (CMR) including at least one tubular membrane formed from the process according to the fifth aspect of the present invention.

The membrane of the present invention can have any suitable configuration selected based on the particular advantages that configuration can provide to a particular CMR configuration.

A CMR is essentially a two-dimensional device which channels syngas along one dimension through a catalyst bed adjacent to a membrane. Flat membranes are easier and cheaper to produce than tubular membranes, but have a larger seal area, as the membranes are sealed around their outer edge. This sealing configuration provides a large sealed area and therefore can be prone to leaks between the raffinate and permeate gas streams. A tubular membrane enables a tubular CMR to be used, and therefore can reduce the seal area. In tubular reactors seals (compression seals or other sealing techniques) are only required at each end of the tube.

In some embodiments, the membranes of the present invention have a tubular configuration, preferably comprising tubes. The tubes can have any desired dimensions. In some embodiments, the outer diameter is between 2 to 25 mm, preferably between 3 and 24 mm, preferably between 5 to 15 mm, preferably between 6 and 13 mm, and more preferably between 8 and 12 mm. In some embodiments, the wall thickness of the tube is less than or equal to 1 mm, preferably between 0.1 and 1.5 mm, preferably between 0.05 and 1 mm, more preferably less than 0.5 mm, and more preferably less than or equal to 0.2 mm. In one exemplary embodiment, the tubular membrane has the following specifications:

Length: ≥300 mm
Outer diameter: 9.52 mm (⅜")
Wall thickness: ≤0.25 mm

In exemplary bodies, the tubular membrane for a catalytic membrane reactor comprising a thin-walled tube comprising a vanadium alloy comprising: vanadium; aluminium having a content of greater than 0 to 10 at % and Ta content of less than 0.01 at %, having a ductility of greater than 10% elongation, preferably greater than 11% elongation.

In some embodiments, the membrane further includes a grain refining element selected from Ti, Cr, Fe, Ni or B having a content of greater than 0 to 5 at %, preferably between 0.2 and 4.5 at %. In some embodiments, the grain refining element has a content from 0.1 to 2 at %, preferably from 0.1 to 2 at %, and more preferably from 0.1 to 1 at %.

In some embodiments, the vanadium alloy has a grain linear intercept of less than 5.0 mm, preferably less than 5.5 mm, preferably less than 4.0 mm, preferably less than 4.5 mm, even more preferably less than 3.0 mm, yet even more preferably less than 2.0 mm and most preferably less than 1.0 mm all based upon a minimum sample size of 6 grains, preferably 8 grains.

In particular embodiments the microstructure comprises dendrites. In these embodiments, the grain linear intercept value is preferably less than 500 micrometres, preferably less than 450 micrometres, more preferably from 50 to 450 micrometres more preferably from 50 to 400 micrometres, even more preferably from 50 to 300 micrometres, more preferably from 100 to 350 micrometres and yet even more preferably from 100 to 200 micrometres, based upon a minimum sample size of 6 grains, preferably 8 grains.

In addition, it is also preferred that the refined vanadium alloy does not include any voids having an average size of greater than 0.5 mm, preferably no greater than 0.4 mm, preferably no greater than 0.3 mm. The grain linear intercept can be determined using method ASTM E112-113 through employment of the Olympus "Stream Essential" image analysis software Unless otherwise stated, the grain linear intercept is a measurement of the width perpendicular to the growth direction of the grain in situations where the grain are not equiaxed (e.g. columnar).

The tubular membrane can have any suitable dimensions as described above. In some embodiments, the thin-walled tube comprises a tube having an outer diameter of between 2 to 25 mm, preferably between 3 and 20 mm and a wall thickness of from 0.05 to 1 mm, preferably from 0.1 to 0.5 mm, as discussed in more detail below.

In embodiments, the vanadium alloy used to construct the vanadium or vanadium alloy substrate used in the present invention is a refined vanadium alloy having being heat treated temperatures of from 800 to 1500° C. and pressures from 50 to 500 MPa. In embodiments, the heat treatment comprises subjecting the vanadium alloy at temperatures of from 1000 to 1400° C., preferably between 1050 to 1380° C., more preferably temperatures up to 1400° C., and yet more preferably about 1200° C. In embodiments, the heat treatment comprises subjecting the vanadium alloy to pressures from 50 to 400 MPa, preferably 75 to 350 MPa, and more preferably about 200 MPa.

In embodiments, refined vanadium alloy has a ductility of greater than 10% elongation, preferably greater or equal to 11% elongation, more preferably greater or equal to 13% elongation, yet more preferably greater or equal to 14% elongation. It should be noted that these are ambient temperature values for elongation.

A further aspect of the present invention provides an aqueous electroplating solution for the electrodeposition of palladium-gold alloys onto a surface of a substrate comprising a soluble palladium compound and a soluble gold complex, wherein the ratio of gold to palladium to in the solution is from 5 to 40 w/w %.

This electrolytic solution is used for aqueous electroplating solution for the electrodeposition of palladium-gold alloys onto a surface of a substrate for example as used in the first and second aspects of the present invention. The electrolytic solution is for forming palladium-gold alloys, where the major metallic component is palladium (greater than 60 at %), and the alloying component is gold. Advantageously, the use of a gold complex allows the solution to be stable, with both aqueous metallic components remaining in solution. Furthermore, this combination surprisingly results in bringing the plating potential of each metal sufficiently close together so that a single potential is capable of simultaneous deposition of both the palladium and add metals to form alloy deposits.

The composition of the Pd—Au alloy deposited on the coating surface can be tailored by varying the proportions of Pd and Au precursors in solution. The w/w % ratio of gold to palladium in the solution is has more palladium than gold, typically ranging from 5 to 40%. In embodiments, the w/w % ratio of gold to palladium in the solution is from 5 to 40%, preferably from 8 to 30%, more preferably from 10 to 30%, yet more preferably from 20 to 23%. It should be appreciated that other factors can affect the composition of the Pd—Au alloy including plating bath temperature, pH, rotation speed, concentration or the like as will be discussed in more detail below.

The concentration of Au in the aqueous electroplating solution can range from 4 to 30 wt %, preferably from 5 to 25 wt %, more preferably from 20 to 25 wt %. In some embodiments, the concentration of Au in the aqueous electroplating solution is preferably from 10 to 25 wt %, preferably from 22 to 23 wt %.

The form in which palladium can be added to the solution can be one or more of a number of suitable palladium compounds. However, the palladium preferably must remain soluble in the electroplating solution and must not cause precipitation. Examples of compounds that can be employed in the solutions include palladium diamino dinitrite (P-salt), palladium nitrate, palladium sulfate, palladium phosphate, a palladium organo sulfonate or a palladium organo phosphonate.

The gold compound must be a gold complex. Again the use of a gold complex allows the solution to be stable, with both aqueous metallic components remaining in solution. In embodiments, the gold complex may comprise sodium gold cyanide ($NaAu(CN)_2$) or potassium gold cyanide ($KAu(CN)_2$). In preferred embodiments, the gold complex comprises potassium gold cyanide.

The substrate can comprise any suitable metallic substrate on which the alloy layer is preferred to be deposited. In preferred embodiments, the substrate comprises vanadium or a vanadium alloy based substrate. In exemplary embodiments, the substrate comprises vanadium or a vanadium alloy based gas separation membrane. One set of suitable vanadium alloy substrates can be formed from the vanadium alloys taught in the Applicant's patent publication No. US20150368762A1, again the contents of which should be understood to be incorporated into this specification by this reference.

BRIEF DESCRIPTION OF THE DRAWINGS

The present invention will now be described with reference to the figures of the accompanying drawings, which illustrate particular preferred embodiments of the present invention, wherein.

DETAILED DESCRIPTION

Figure 1:
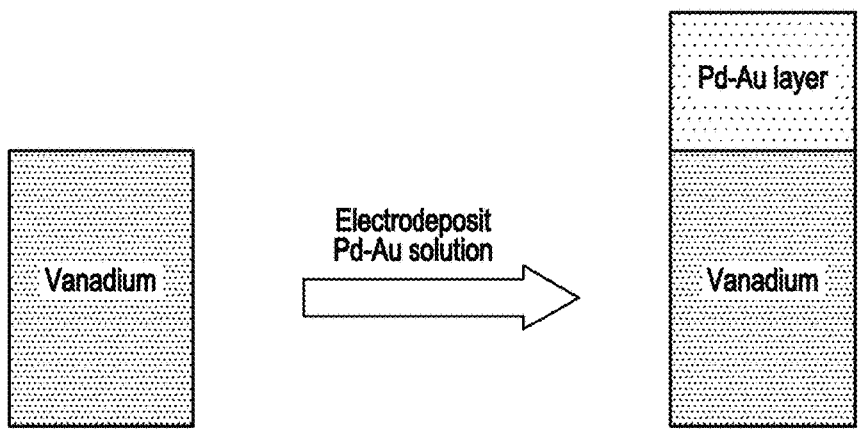
FIG. 1 provides a schematic illustration of the Pd—Au alloy deposition method according to embodiments of the present invention.

The present invention generally relates to a method of forming a Pd—Au alloy layer or layers on a substrate. In one exemplary form, the present invention relates to a method of forming a sulfur-tolerant palladium-gold alloy layer or layers on a vanadium or vanadium alloy substrate, for example a membrane, using a new aqueous Pd—Au electrolytic solution in a single deposition step.

The electrolytic solution of the present invention is used to form palladium-gold alloys coatings on a substrate, typically a metallic substrate such as vanadium or vanadium alloy substrate, where the major metallic component is palladium (greater than 60 at %), and the alloying component is gold. Advantageously, the use of a gold complex allows the solution to be stable, with both aqueous metallic ions remaining in solution.

The palladium and gold can be added to the solution in various forms so long as the palladium and gold containing species are soluble in the electroplating solutions and do not cause precipitation. Examples of compounds that can be employed in the solutions include palladium diamino dinitrite (P-salt), palladium nitrate, palladium sulfate and the organo sulfonic acid salts of palladium. Gold must be added as a complex for stability purposes. Suitable gold complexes include potassium gold cyanide and sodium gold cyanide.

The temperature of the bath depends upon amounts of palladium and/or gold in the solution, the desired surface finish, the particular palladium salts and/or gold complexes being used, and the like, and can be readily determined by routine experimentation. Generally a bath temperature of from 10 and 60° C., preferably from 20 to 50° C. has been found to be sufficient in most cases. The pH of the electrodeposition solution can have similar effects, and it has been found that the electrodeposition solution of the deposition bath preferably has a bath pH of between 8 and 9, preferably from 8.4 to 9. The current density also has an effect on the coating quality. It has been found that the electrodepositing step is preferably conducted using a current density of from 1 to $10 \times 10^{-2}$ A/cm$^2$, and preferably from 3 to $5 \times 10^{-2}$ A/cm$^2$. For example, for an electrolytic solution of potassium gold cyanide with a soluble palladium content, for example around palladium nitrate, it has been found that the electrodepositing step is preferably conducted around 4.14 to $10 \times 10^{-2}$ A/cm$^2$.

The inventors have found the following concentration dependence using the electroplating solution of the present invention: 5 wt % Au in solution gives 18-19 mol % Au in an deposited layer using the electroplating solution; 10 wt % Au in solution gives 24 to 25 mol % Au in the layer; and 15 wt % Au in solution gives 30 to 32 mol % Au in the layer. Existing literature indicates that 20-25 mol % Au sulfur tolerance is ideal. The concentration of Au in the aqueous electroplating solution can therefore range from 5 to 30 wt %, preferably from 5 to 25 wt %, more preferably from 20 to 25 wt %.

The anode preferably comprises mixed metal oxide plated titanium which is commonly used in plating pure palladium. The cathode can be of most any base metal, but it is preferred to initially plate the base metal cathode with a thin coating of a noble metal, or a noble metal alloy, preferably silver or gold or palladium to prevent the gold and/or palladium content in the solution from plating by immersion (electroless plating) on the base metal cathode.

The palladium to gold ratio of the electrolytic solution will, of course, vary depending on the composition of the alloy desired. The composition of the deposited alloy can be varied by changing primarily the ratio of palladium to gold in the electrolytic solution. However, other factors such as bath temperature, bath pH, current density, concentration (solution and constituents) and the like can also effect the final composition and/or morphology of the deposited alloy.

The application of a Pd—Au layer generally requires any oxide layer or contamination (dirt, oil, particles and any other debris) on the coating surface of the substrate to be removed using a series of cleaning procedures. In most cases, these cleaning procedures comprise a combination of mechanical and chemical cleaning steps that are conducted prior to deposition of Pd—Au alloy onto that surface using electroplating plating. In this respect, the surface should preferably be free of any oils and oxide layers to enable good adhesion of the alloy layer during electroplating. In embodiments, the vanadium surface undergoes:
- Washing or degreasing by immersing the substrate in a suitable solvent, such as isopropanol, and ultrasonic agitation;
- mechanical cleaning, including abrasive contact, such as mechanical buffing, sanding, brushing or the like; and
- Chemical etching, preferably acidic etching, more preferably cathodic acid etching, for example cathodic etching using hydrofluoric acid.

It should be appreciated that the cleaning steps can be interspersed between or with one or more additional washing procedures, where a solvent or other washing fluid, such as water, preferably deionised water and/or an alcohol, such as isopropanol, is used to wash the coating surface of the substrate between cleaning procedures.

A variety of specific cleaning regimes can be used. One particular cleaning regime is outlined in detail in the examples detailed below. However, a number of cleaning regimes include the following general steps:
- Surface preparation and cleaning: Here the surface of the substrate is cleaned with at least one of water, preferably deionised water, an alcohol, such as isopropanol.
- Mechanical Cleaning: Here the surface of the substrate is cleaned by abrasive action using cleaning brushes or abrasive bodies, such as a gritted surface. Where the substrate may include multiple surfaces, for example a tube, all surfaces should be cleaned. For example, for a vanadium tube, the inside of the tube can be cleaned using an abrasive tool such as a brush or scrubber, with fluid flushing such as deionized water. The outer surfaces can also be cleaned using a like abrasive tool, but is more preferably cleaned using an abrasive body such a sand paper or other gritted paper, preferably supported in a lathe to ensure an even coating surface.
- Electrolytic Cleaning: In some cleaning regimes, a dilute acidic solution, for example 5 to 15%, preferably about 10% $H_2SO_4$ or hydrofluoric acid can be applied to the surface to remove any oxides formed between mechanical cleaning and plating. Selection of the acid will depend on the composition of the substrate surface. For vanadium surfaces, hydrofluoric acid is preferably used.

Again, it should be appreciated that the cleaning steps can be interspersed between or with one or more washing procedures as described above.

After cleaning the vanadium based substrate is then immersed in the electroplating solution. Where the substrate comprises a tubular substrate, it is preferred that the tubular substrate is continuously rotated at a constant or even speed within the electroplating solution to produce an even coating thereon.

The Pd—Au alloy coating deposited on the coating surface should have good adherence to the coating surface. In embodiments, adherence to the coating surface can be tested in accordance to ASTM D3359-97: Standard Test Methods for Measuring Adhesion by Tape Test. This standard provides a method to evaluate adhesion of a coating to different substrates or surface treatments, or of different coatings to the same substrate and treatment using a scale of 0 A to 5 A. The test provides an indication of whether the adhesion of a coating to a substrate is at a generally adequate level. The tests according to this standard do not distinguish between higher levels of adhesion for which more sophisticated methods of measurement are required. For metallic surfaces, the test methods cover procedures for assessing the adhesion of coating films to metallic substrates by applying and removing pressure-sensitive tape over cuts made in the film. The Pd—Au alloy coating deposited on the coating surface preferably has a 5A classification in accordance to ASTM D3359-97.

The visual appearance of the Pd—Au alloy coating is also a good indicator of the quality of the deposited Pd—Au layer. The Pd—Au alloy coating deposited on the coating surface preferably has a:
- shiny/mirror appearance indicating a low surface area and low surface roughness; or
- has a coating having a dark and dull appearance indicates that the coating is a rough layer with a high surface area.

In comparison, a coating having a dull, powdery appearance is therefore not plated or adhered correctly to the coating surface.

It should be appreciated that a rougher surface has increased permeability compared to shiny/mirror appearance. Surface roughness is good, providing adhesion to the coating surface is not compromised. Roughness=higher surface area=more sites for $H_2$ dissociation. Ideally, the roughness of the Pd—Au coating can be graduated, i.e., starting with a dense Pd alloy layer to ensure good coverage of the V-based substrate, then gradually manipulating the layer through temperature, current density or rotation sped to create a rougher outer surface, and thus more sites for $H_2$ dissociation.

The Pd—Au alloy coating deposited on the surface has a purity of at least 99.9%, and more preferably at least 99.99%.

The Pd—Au coating of the present invention is particularly suitable for use as a $H_2$ dissociation catalyst coating of a catalytic alloy membrane of a catalytic membrane reactor (CMR). The composition and resulting properties of the alloy can be deposited on a vanadium alloy based membrane for use in forming a tubular membrane for a CMR.

Alloy membranes operate via a solution-diffusion mechanism, whereby:
- molecular $H_2$ adsorbs on the high-pressure surface and is split into atomic hydrogen;
- the atomic hydrogen dissolves into the metal and migrates by jumping between interstitial sites in the metal lattice, driven by a concentration gradient; and the atomic hydrogen recombines to $H_2$ on the low-pressure surface and desorbs.

Vanadium forms a tightly-held oxide layer which is poorly catalytic and acts as a barrier to hydrogen dissolution. A catalytic surface is preferably applied to the alloy membrane to achieve a sufficient reaction rate of splitting of the hydrogen molecule at the membrane feed surface.

To function as a membrane, the oxide must be removed and a thin layer of Pd—Au alloy, and the Pd—Au alloy layer (functioning as a $H_2$ dissociation catalyst layer), is applied in accordance with the present invention. Once the Pd—Au alloy layer is applied to the internal surface of a selected tube, the membrane tube can be used in a number of separation applications for example use as a membrane separator (separation only device) or as a $H_2$-selective membrane in a catalytic membrane reactor (CMR).

Figure 2:
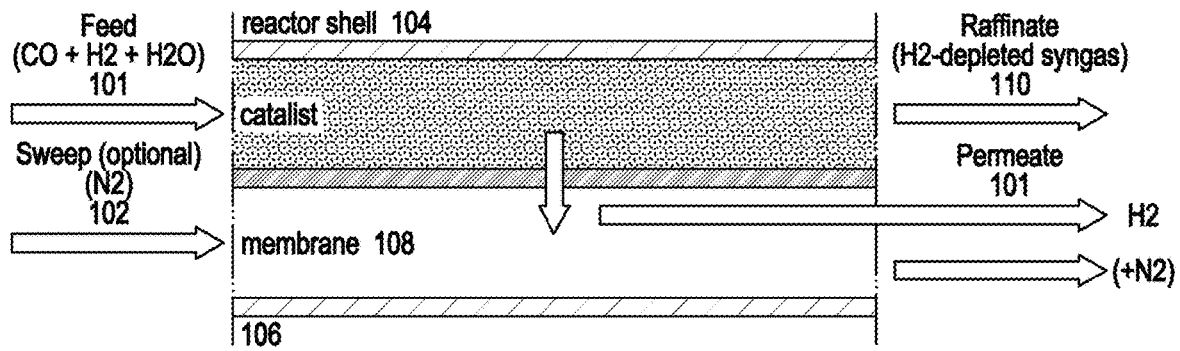
FIG. 2 illustrates a schematic of a catalytic membrane reactor (CMR) which can include a vanadium alloy membrane including the Pd—Au alloy deposition coating produced using embodiments of the present invention.

One non-limiting use of a membrane tube which includes the Pd—Au alloy layer is in a CMR. A typical CMR 100 is shown in FIG. 2 illustrating the close coupling of the water-gas shift conversion catalyst 106 and $H_2$-selective membrane 108. The illustrated CMR 100 schematic shows a plate membrane with a $CO+H_2+H_2O$ feed 101, feed into the reactor shell 104, between which sits the catalyst 106 and membrane 108. The feed 101 undergoes that water-gas-shift (WGS) in the catalyst 106 to produce a raffinate 110 ($H_2$-depleted syngas) and $H_2$ permeate 112. An optional nitrogen sweep 102 can also be used for $H_2$ exiting the membrane. Being exothermic, the WGS reaction is favoured at lower temperatures, but reaction kinetics is favoured at high temperatures. To overcome this limitation, commercial WGS processes include a high temperature stage (~450° C., for fast kinetics, which reduces the required reactor size) and a low temperature stage (~200° C., to maximize conversion of residual CO from the high-temperature stage). A CMR allows the low-temperature reactor to be eliminated by allowing high WGS conversion at high temperature. Applied to the processing of coal-derived syngas, a CMR can achieve near-complete CO to $H_2$ conversion, $H_2$ purification and pre-combustion $CO_2$ capture in a single device.

Figure 3:
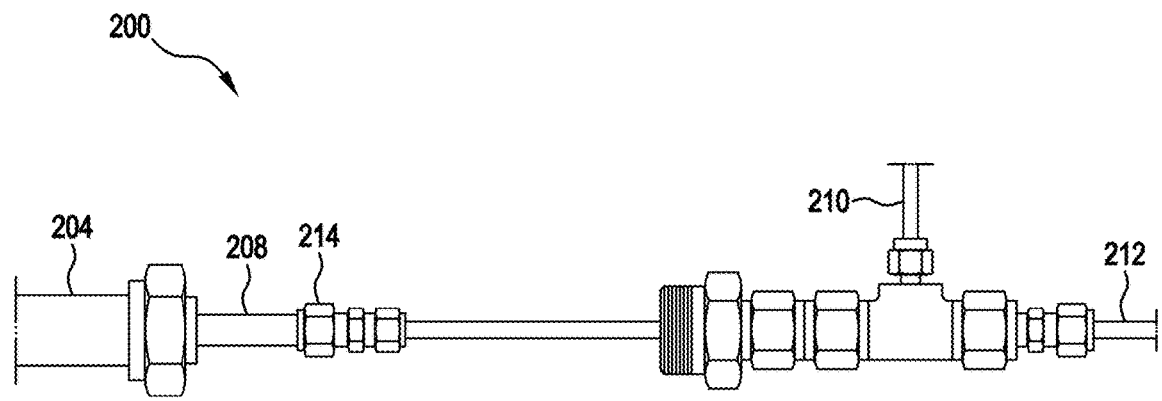
FIG. 3 provides a photograph of a prototype tubular CMR which can include a vanadium alloy membrane including the Pd—Au alloy deposition coating produced using embodiments of the present invention.

A prototype tubular CMR 200 which can include a Pd—Au coated vanadium tubular membrane of the present invention is shown in FIG. 3. The tubular CMR 200 incorporates a tubular membrane 208 within a tubular shell 204, with the catalyst occupying the annular space within the shell 204. It is noted that a CMR, or any membrane module, could include single or multiple tubes within the same tubular shell, for example 4, 6 or 12 tubes could be enclosed in the same tubular shell. The greatest advantage of this configuration is the reduced seal area, with seals (for example 214) required only at each end of the tube. Again, the CMR 200 produces a raffinate 210 ($H_2$-depleted syngas) and $H_2$ permeate 212. The tubular CMR also allows for greater use of readily available tubing and compression fittings, making for simple and reliable assembly.

The tubular configuration of the membrane offers a significant advantage over the planar configuration in terms of a greatly reduced sealing area, increased surface area and simpler construction. Vanadium-based alloy membranes, when compared to palladium alloy membranes, offer a further advantage in manufacturing. Pd-based membranes must be very thin to minimise cost and maximise hydrogen permeance. This often necessitates the use of a porous support structure. The higher permeance of V-based alloys allows for thicker membranes, with a thin catalytic outer and inner layer, which can be self-supporting. This greatly reduces the complexity and cost of the manufacturing process.

The desired alloy tubing is intended to have the following dimensions:
diameter (2 to 25 mm); and
wall thickness (0.05 to 1.00 mm).

EXAMPLES

Comparative Example No. 1

A number of plating solution compositions were investigated to determine a suitable mixture of compounds and combinations for a Pd—Au plating solution.

A solution was formed from a mixture of diammino palladous nitrate solution with gold sulphite solution. Each of the precursor solutions were sourced from Metakem GmbH, Usingen, Germany.

Figure 16:
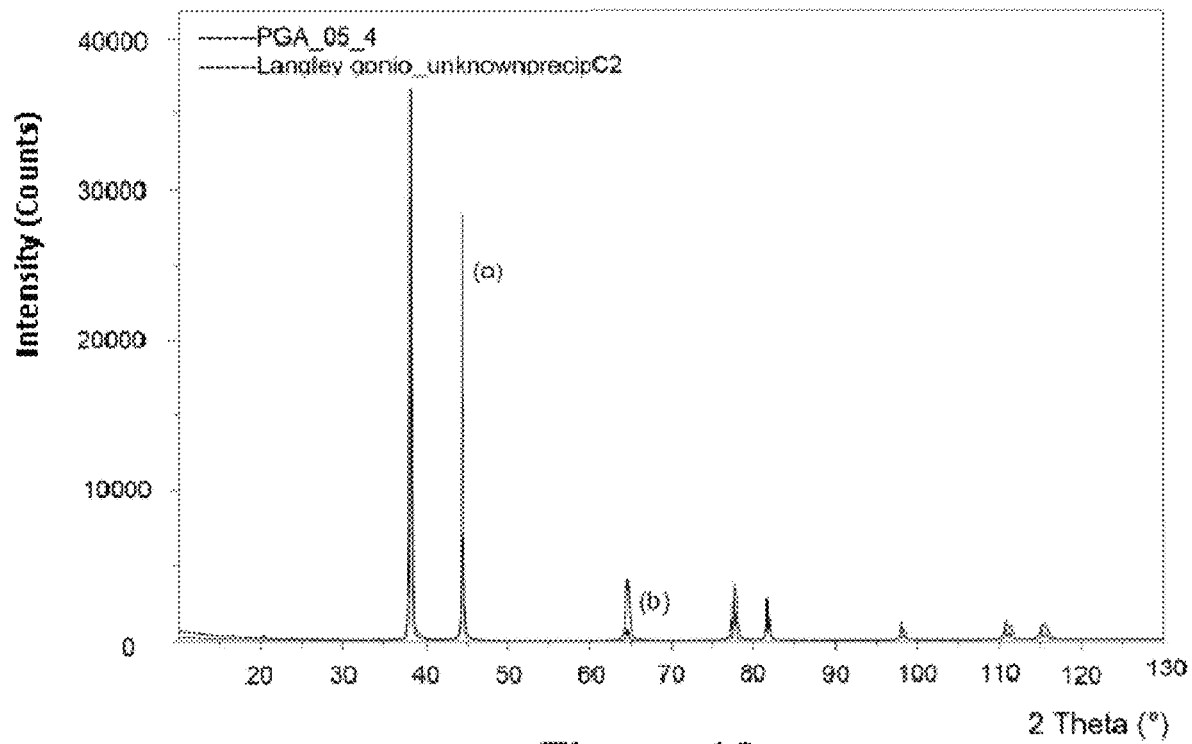
FIG. 16 provides a comparison of the XRD spectra of (a) gold standard; and (b) unknown precipitate. These images show that the approach of blending non-complexed gold with Pd does not work as the gold precipitates from solution.

After mixing, the solution was found to be unstable with gold precipitating from the solution within 1 hour. It was speculated that an insitu redox reaction, most likely oxidation of sulfite to sulfate caused the reduction of $Au^+$ ions to Au metal. A more stable Au precursor compound was concluded to be required to stabilise gold against redox reactions (as shown in FIG. 16).

Example 1

Complexed Gold Precursor

An electroplating solution was formed from a mixture of diammino palladous nitrate solution with potassium gold cyanide solution mixed in a ratio of palladium:gold of 80:20 and 70:30. Each of the precursor solutions were sourced from Metakem GmbH, Usingen, Germany.

After mixing, the solution was found to be stable with no precipitation of gold from the solution within 2 months.

Figure 4:
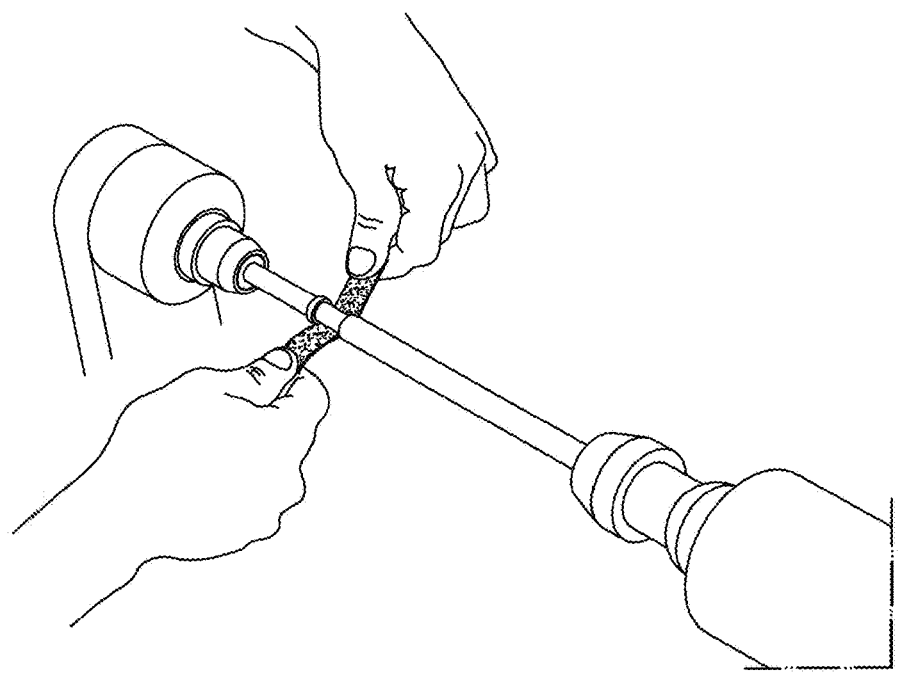
FIGS. 4 and 5 illustrate particular cleaning steps for a vanadium based alloy prior to application of the Pd—Au coating.
Figure 5:
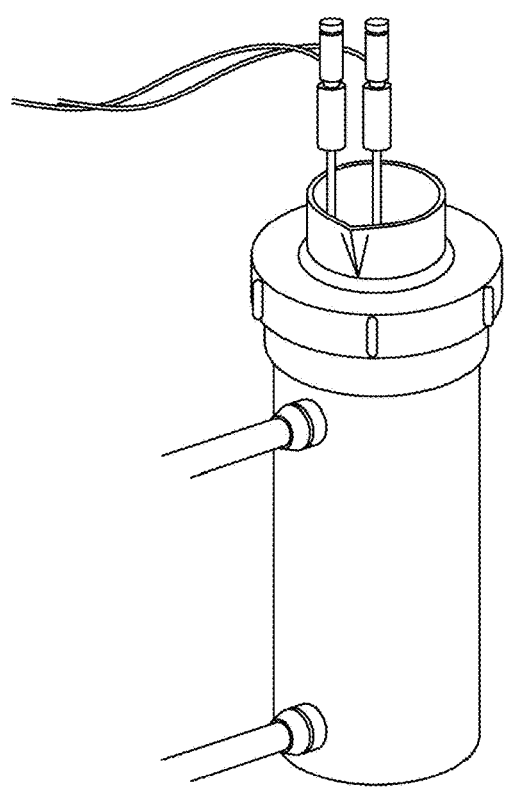

Two vanadium tubes were provided for electroplating. Prior to electroplating, the outer surface of the vanadium tube was cleaned to remove any oils and oxide layers to enable good adhesion of the alloy layer during electroplating. As shown in FIGS. 4 and 5, the tube underwent mechanical cleaning, and more specifically mechanical buffing using an abrasive medium (FIG. 4); and cathodic acid etching using hydrofluoric acid (FIG. 5). FIG. 5 shows the cleaning step for cleaning inside the tube. It is noted that in this embodiment, the inside of the tube is plated with pure Pd as this passage will not have any $H_2S$ present when in use. More detail of this cleaning methodology is outlined in Example 2 below.

Figure 6:
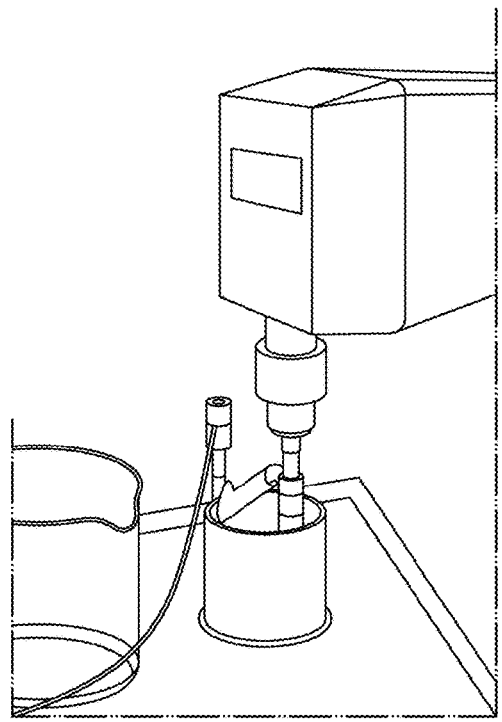
FIG. 6 illustrates one electrodeposition setup for electrodepositing a Pd—Au coating on a vanadium alloy tube according to one embodiment of the present invention.

The electroplating solution was plated onto the outer surface of each cleaned vanadium alloy tube at a plating temperature of ~30° C. and a pH of between 8 and 8.5. The vanadium alloy tubes were rotated continuously in the electroplating solution using overhead stirrer setup illustrated in FIG. 6. This produced the continuous and even alloy coatings illustrated in FIGS. 7a and 7b.

Figure 7A:
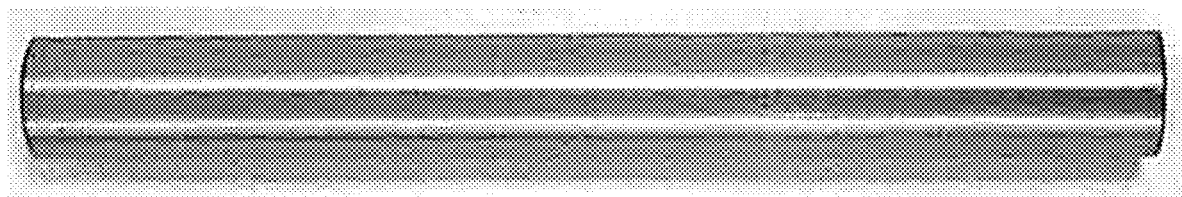
FIG. 7 illustrates two vanadium alloy tubes plated with continuous and even Pd—Au alloy coatings according to embodiments of the present invention, wherein (a) is a $Pd_{50}Au_{20}$ coating; and (b) is a $Pd_{70}Au_{30}$ coating on the left half of the tube to illustrate the difference in appearance between the uncoated vanadium tube and the plated tube.
Figure 7B:
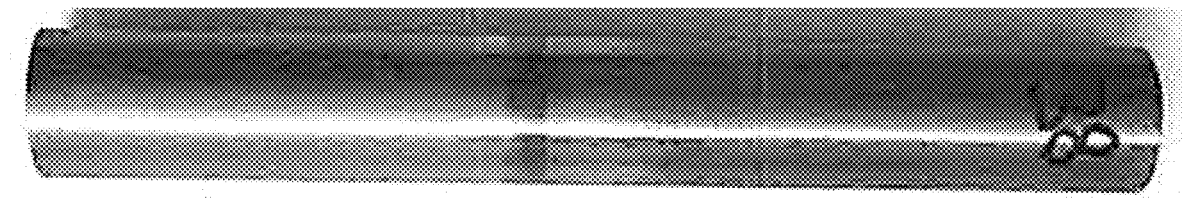

Adhesion of the alloy coatings illustrated in FIGS. 7a and 7b to the coated vanadium alloy surface were tested using the sticky tape test set out in ASTM D3359-97: Standard Test Methods for Measuring Adhesion by Tape Test. Both alloy coatings were found to have high adherence under the test.

Example 2

Palladium—Gold Alloy Film

In the experimental trials detailed in this example, a palladium—gold alloy film was deposited onto:
A). flat plate substrates; and
B). 10 mm-diameter×100 mm-long vanadium tubes, for laboratory testing of sulfur tolerance.

The chemical properties of the plating solutions were altered to both increase the stability and to determine the variables that will affect the plated alloy composition. The composition of the deposited alloy layer was quantified by x-ray diffraction (XRD) analysis.

Methodology

Figure 8:
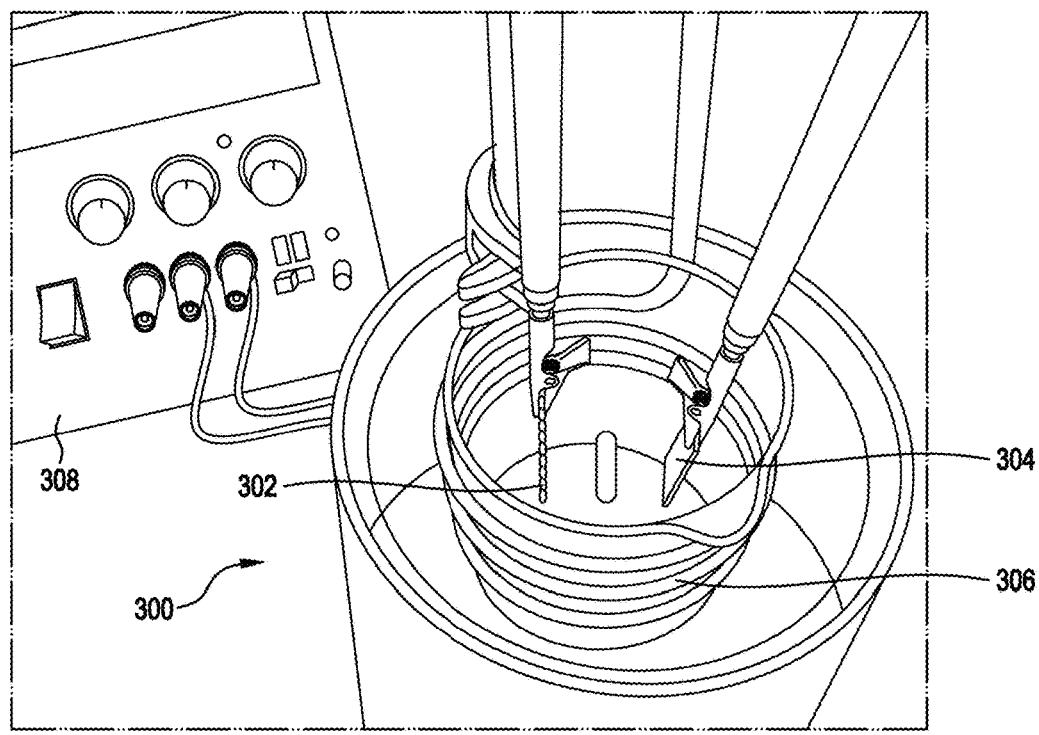
FIG. 8 provides a photo of a small coupon plating apparatus experimental set up used in plating planar plate stainless steel substrates in an experimental procedure.

The following experimental apparatus were used in the trial experiments:

Small Planar Coupon Plating Apparatus: FIG. 8 shows a small coupon plating apparatus 300 which was used to plate planar substrates. A 65×20 mm mixed metal oxide coated titanium anode 302 was placed in a heated bath, along with the substrate to be plated 304. The bath was placed on a magnetic stirrer (not shown) and then heated to 52 to 55° C. via a coiled copper heat exchanger 306, which is submerged in water to aid with head dispersion and thermal stability. The power supply 308 provided fixed current with a variable voltage.

Figure 9:
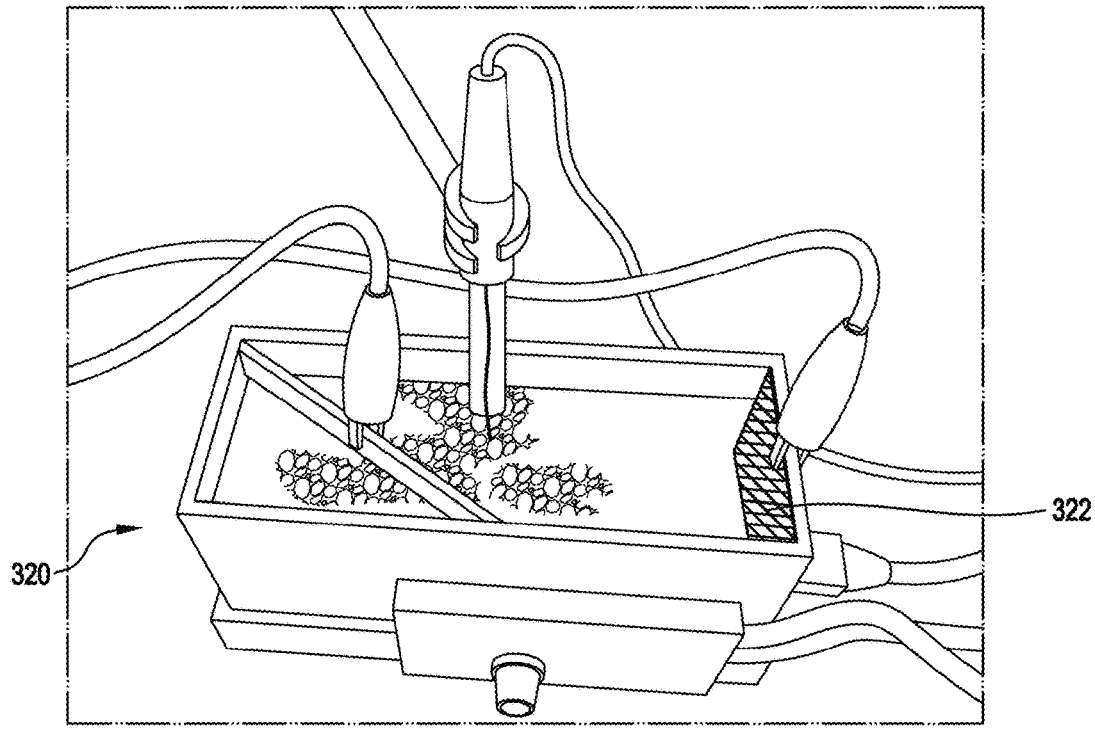
FIG. 9 shows a Kocour auto hull cell experimental set up used to test a broad spectrum of current densities substrates in an experimental procedure.

Hull Cell: FIG. 9 shows the setup of a Kocour auto hull cell 320 which was used to test a broad spectrum of current densities in one experiment, as current density decreases with increasing distance from the an anode 322. This is advantageous when testing a relatively unknown plating solution. As cyanide contain gold salts were been tested, this experiment was carried out in a fume cupboard with constant pH measurement. In the case of a pH decrease, small amounts of 30 w/w % ammonium hydroxide was added to increase the pH to above 8.5. This is important as there is a risk of HCN release in environments where the pH is lower the 7.5.

Figure 10:
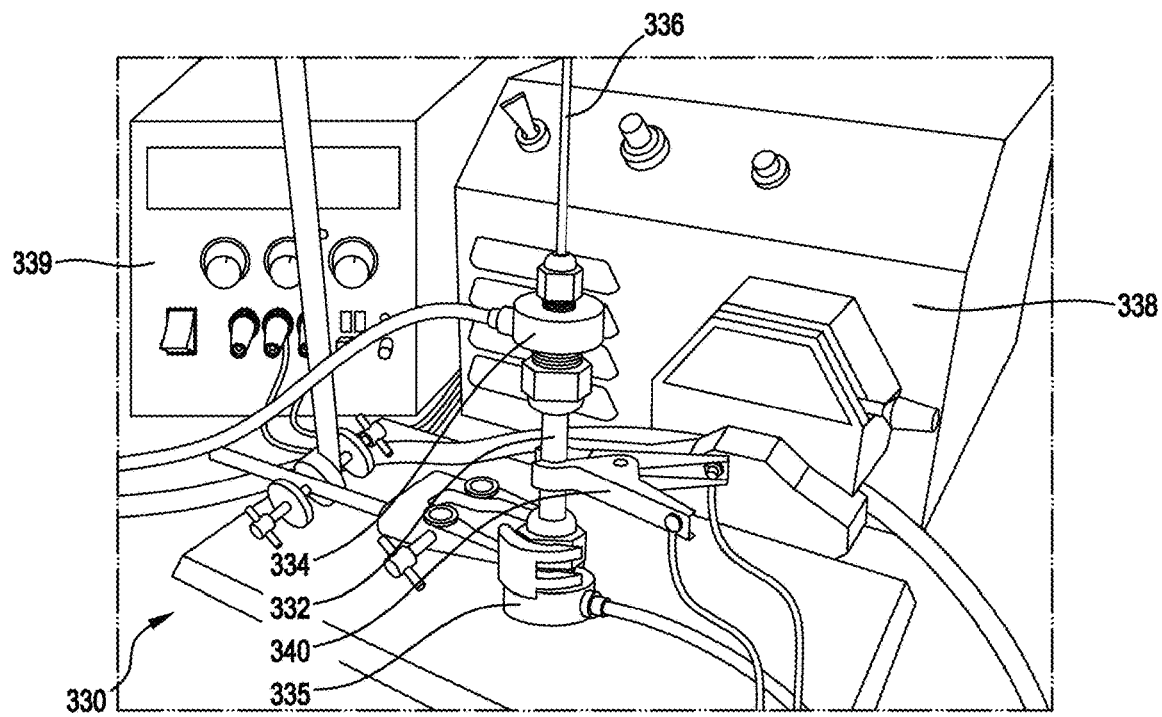
FIG. 10 shows an inner tube plating apparatus plating apparatus experimental set up used in plating a tubular vanadium substrates in an experimental procedure.

Inner tube plating apparatus: FIG. 10 shows an inner tube plating apparatus 330 which was used to plate the inside surface of a tubular substrate 332. The illustrated apparatus consists of and upper 334 and lower 335 sealing gland that allows the plating solution to be pumped up the inside of the tubular substrate 332, without coming into contact with the outside. The anode 336 is a 3 mm mixed metal oxide coated titanium rod that runs through the centre of the gland. The plating solution is heated in a water bath (not shown) and a constant flow is supplied by a peristaltic pump 338, this can be adjusted as necessary. The substrate is connected to a power supply 339 via a clamp 340 with soldered in copper cradles, to increase the contact area with the tubular substrate 332.

Figure 11:
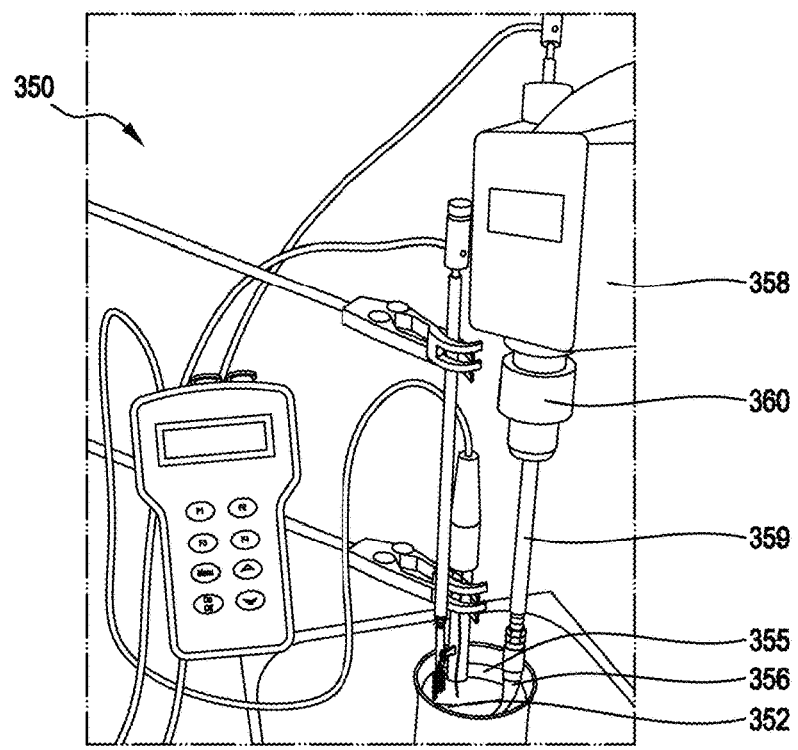
FIG. 11 shows an outer tube plating apparatus plating apparatus experimental set up used in plating a tubular vanadium substrates in an experimental procedure.

Outer Tube Plating Apparatus: FIG. 11 shows the tube plating apparatus 350. A 1 L measuring cylinder, 59 mm in diameter, was cut off at 600 mL to form a plating vessel 352 and submerged in a heated water bath 354. This allows for 500 mL of plating solution. The heated water bath 354 has a poly carbonate lid to avoid water loss from evaporation. An 85×20 mm mixed metal oxide coated titanium anode 355 is attached to the positive terminal of a power supply place inside the plating vessel 352, ensuring that it is to the same depth as the substrate 356. An overhead stirrer 358 is placed over the plating vessel 352 and pre-set to 50 rpm, this is to provide both variable agitation and ensure a homogeneous plating on the tubular surface of the substrate 356. A rod 359 with a m6 male thread on one end and a 4 mm diameter hole in the other is placed in the chuck 360 of the overhead stirrer 358, ensuring that the tube holder with be just under the fluid level. The chuck 360 must be clamped onto the heat shrink to isolate the current from the overhead stirrer 358. The negative terminal is attached to the top of the rod 359 with a banana plug 362. The tube holder (not illustrated in detail) has been designed with 2 conical ends that seal against the tube. One end is made of brass and has a M6 thread to ensure the current flow from the rod. The other end is made of nylon to prevent current flow. Both are connected with M5 stainless steel threaded rod. Once the tube/tubular substrate was electrolytically cleaned, it was threaded onto the stirring shaft and lowered into the plating solution.

Substrate Preparation

Stainless Steel Coupon: A stainless steel sheet was cut into 75×25×1.6 mm coupons and prepared as follows:
  2 minute soak in isopropanol with ultrasonic agitation;
  Distilled water (deionised water) rinse;
  10 minute soak in 1 w/w % Alconox cleaning detergent with ultrasonic agitation;
  deionised water rinse;
  Surface to be plated sanded with p500 grit silicon carbide paper;
  Coupon rinsed with acetone and dried at 70° C.;
  To avoid unnecessary depletion of the plating solution, the reverse side of the coupon covered with adhesive, non-conductive tape.

Copper Hull Cell Panel: Copper sheet was cut into 1.6×125×80 mm copper coupons and prepared as follows:
  Both sides sanded with p500 grit silicon carbide paper;
  Panel rinsed with acetone and dried at 70° C.;
  Reverse side covered with adhesive, non-conductive tape;
  5 minute soak in isopropanol with ultrasonic agitation;
  Deionised water rinse;
  5 minute soak in 1% Alconox cleaner with ultrasonic agitation;
  Deionised water rinse;
  5 minute soak in deionised water with ultrasonic agitation;
  deionised water rinse;
  10 s bright dip in 10% $H_2SO_4$;
  Electrolytic clean in ZFF cleaner (see above for setup) at 8.6 V for 30 s; and
  Deionised water rinse twice.

Vanadium Tube Preparation: Vanadium tube was cut into the desired length using a low speed diamond saw and prepared as follows:
  15 minute soak in isopropanol with ultrasonic agitation;
  Wipe dry with Lint-free paper towel;
  Deionised water rinse;
  15 minute soak in 1% Alconox cleaner with ultrasonic agitation;
  Bulk tubes are stored in the Alconox until needed; and
  Deionised water rinse.

Figure 12:
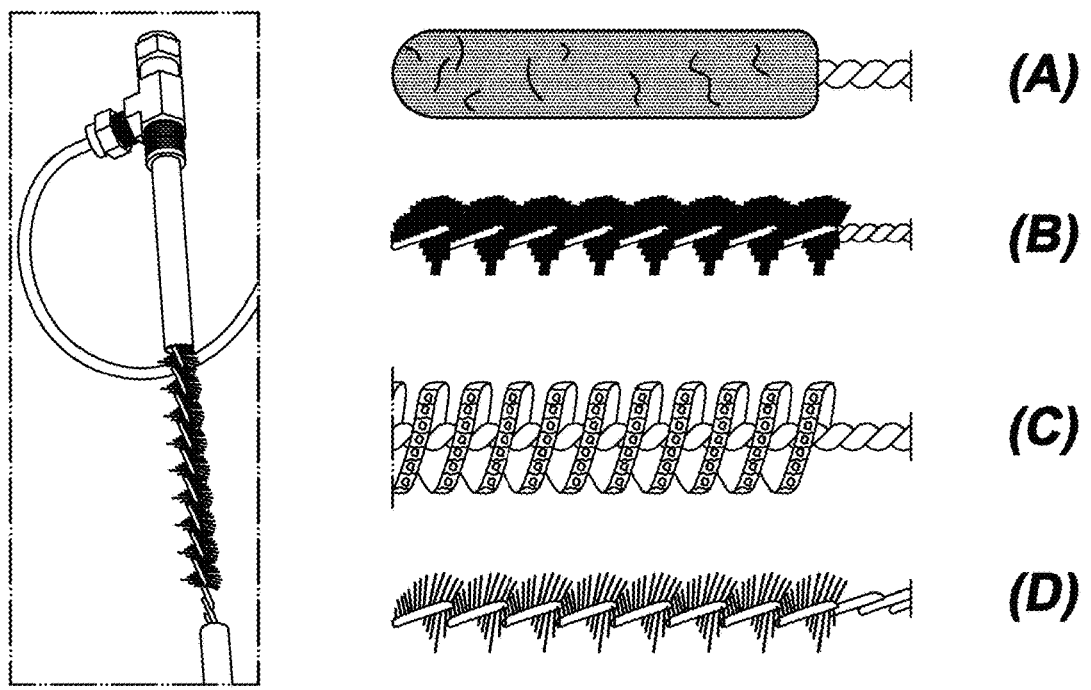
FIG. 12 shows (A) the experimental set up for cleaning the inner tube of a tubular vanadium substrate; and (B) the selection of inner tube cleaning brushes comprising (a) Bore Mop; (b) Nylon Brush; (c) Flexhone; and (d) Spingrit.

Cleaning inside the Vanadium Tube: A ⅜-⅜-¼ tee compression fitting is set up with a water and 1% Alconox been pumped to the ¼ fitting. Each must be isolatable. One ⅜ connection is capped and the tube to be cleaned is inserted into the other, this is shown in FIG. 12(A):
  Insert the Spingrit brush into a battery drill and, with deionised water flowing, pass the brush through the tube on high speed 6 times. For brush types, refer to FIG. 12(B) which shows a) Bore Mop brush; (b) Nylon Brush; (c) Flexhone brush; and (d) Spingrit brush;
  Repeat using Flexhone brush;
  Switch from deionised water to 1 w/w % Alconox;
  Repeat step 2 with the nylon brush;
  Switch back to deionised water;
  Repeat step 2 with nylon brush;
  Wet the bore mop with deionised water and pass through the tube 6 times;
  Push cotton buds that have been soaked in deionised water through the tube until the come out clean; and
  Electolytically clean in 10% HF to remove any vanadium oxides and immediately plate.

Figure 13:
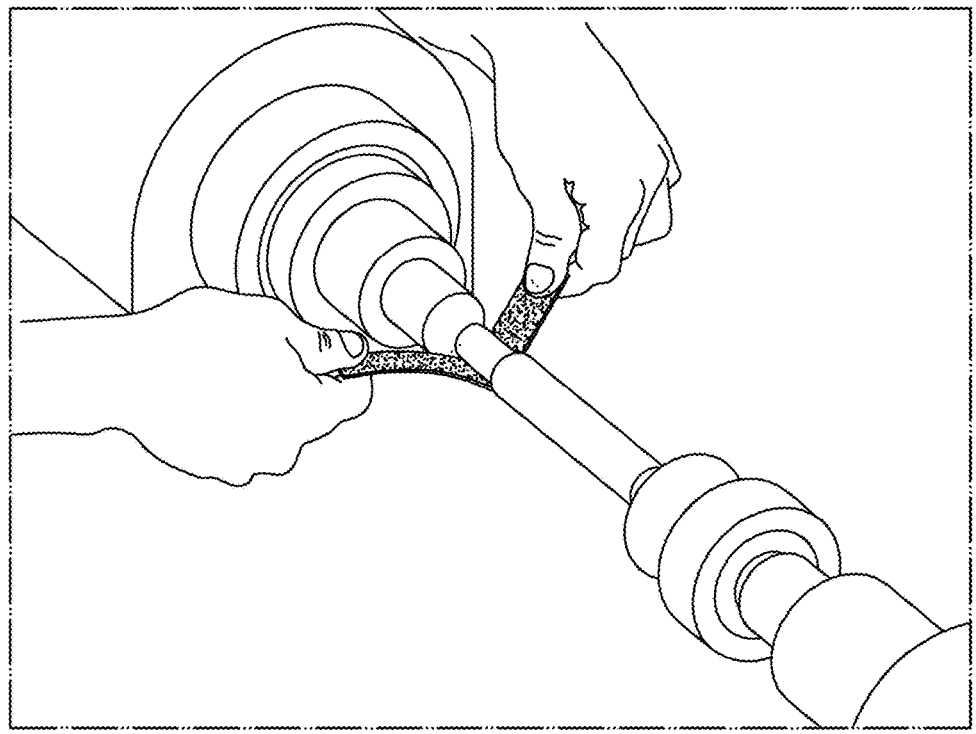
FIG. 13 shows the experimental set up for cleaning the outside of a tubular vanadium substrate using mechanical cleaning i.e., abrasion to remove oxide using SiC abrasive paper.

Cleaning the outside of the Vanadium Tube: The experimental vanadium tube was placed in a lathe as shown in FIG. 13. The outer surface was then treated as follows:

Grind evenly and thoroughly with 500 grit silicon carbide paper, ensuring the that surface is always wet and regularly rinsed with deionised water;

Once that surface is free of defects and appears even, rinse with deionised water;

Dip a cotton wool bud in 1 w/w % Alconox and run along the length of the tube. Repeat until no black residue is left on the cotton wool;

Rinse with deionised water and repeat the previous step with cotton wool deionised water;

Remove the tube from lathe with tweezers, ensuring that the surface is not touched; and The tube is placed in the tube holder and tightened, ensuring that the ends do not get flared, but there is a liquid tight seal.

ZFM electrolytic cleaning: The sample copper panel was dipped into a solution of 10% $H_2SO_4$. This was done to remove any copper oxides formed between grinding and plating. The panel was then cleaned by dipping in deionised water. The panel was then electrolytically cleaned in ZFM cleaner—a commercial sodium hydroxide base electrolytic cleaner. The panel was attached to an alligator clip and held parallel to and approximately 40 mm away from a stainless steel anode. The panel was etched cathodically at room temperature for 30 s at 8.6 V. The cleaning residue was then rinsed off by dipping in two separate beakers of deionised water sequentially. The panel was then immediately plated to avoid re-oxidisation of the copper.

Figure 14:
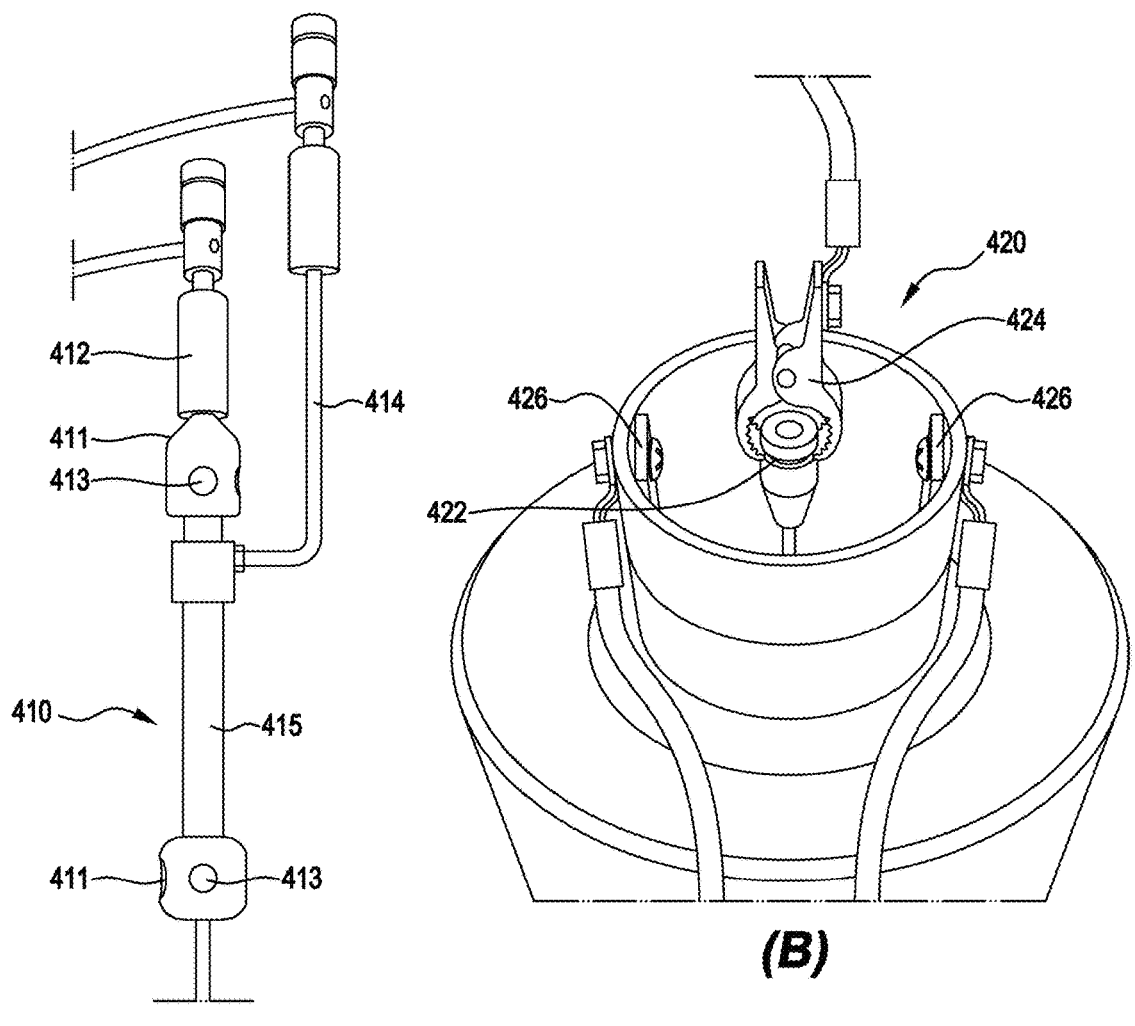
FIG. 14 shows the Hydrofluoric acid (HF) cleaning set up showing (a) HF cleaning inside tube; (b) HF cleaning outside tube; and (c) overall setup.
Figure 14:
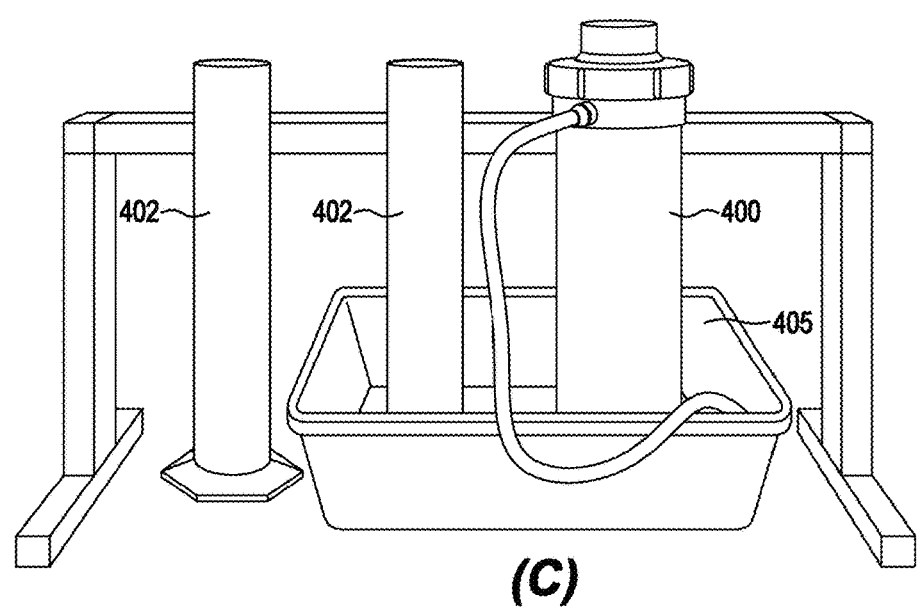

Hydrofluoric Acid Electrolytic Cleaning:

FIG. 14 shows the apparatus used for hydrofluoric acid (HF) based electro-cleaning of the experimental vanadium tubes. FIG. 14(c) shows the HF bath 400 and two deionised water rinse vessels 402 used for both inside and outside cleaning of experimental vanadium tubes. The HF bath vessel 400 was contained in a heated bath that was heated to 40° C. Both the acid 400 and first rinse vessels 402 are contained in a plastic tub 405, to contain any potential spills.

FIG. 14(a) shows the support bracket 410 for cleaning the inside of the vanadium tube 415. A 3 mm stainless steel anode 412 was fixed in the middle of the tube with two nylon bushes 411 and attached to the power supply (not shown). The tube connection bracket 414 was also located in a nylon bush to prevent electrical contact with the anode 412. This bracket 414 also provides the electrical connection between the tube 415 and the power supply.

Once mechanically cleaned, the tube 415 was placed in the support bracket 410 and submerged in 10 w/w % HF. It was etched cathodically at 333 A per m² of tube, for 60 s, followed by a 30 s soak in the acid. It was then dipped twice in each deionised water rinse to ensure that all acid was removed before plating. It is important that the surface of the tube never dries and that plating commences within 60 s, preventing excessive regeneration of a vanadium oxide layer.

FIG. 14(b) shows the set-up 420 for HF cleaning of the outside of the same tube. Here, the same tube holder 422 was used for outer plating and electrolytic cleaning. As shown in FIG. 13(b), the brass end of the tube holder 422 was connected to an alligator clip 424 and submerged in 10 w/w % HF. It was important that the entire tube was in contact with the acid and that the tube was held parallel with the stainless steel anode 426. It was etched cathodically at 333 A per m² of tube, for 60 s, followed by a 30 s soak. It was dipped twice in each deionised water rinse to ensure that all acid was removed before plating. It is important that the surface of the tube never dries and that plating commences within 60 s, preventing the regeneration of a vanadium oxide layer.

Substrate Analysis

Visual Appearance: The first test for plating quality analysis was visual. If the surface looks shiny/mirror like the coating is a lower surface area, soft layer. If the surface looks dark and dull the coating is a high surface area, rough layer. It the layer appears dull and powdery something has likely gone wrong with the surface preparation and the trial should be repeated.

Adhesion Test: Adhesion tests should be carried out following the 'Standard Test Methods for Measuring Adhesion by Tape Test'—ASTM D3359-97: Measuring Adhesion by Tape Test," 1997. A blemish free area must be tested and graded following the scale in Table 1.

TABLE 1

Adhesion test scale extracted from D 3359 - 97: Standard Test Methods for Measuring Adhesion by Tape Test (from "ASTM D3359 - 97: Measuring Adhesion by Tape Test," 1997).

| Grade | Observation |
| --- | --- |
| 5A | No peeling of removal |
| 4A | trace peeling or removal along incisions or at their intersection |
| 3A | Jagged removal along incisions up to 1/16 in. (1.6 mm) on either side |
| 2A | Jagged removal along most of incisions up to 1/8 in. (3.2 mm) on either side |
| 1A | Removal from most of the area of the X under the tape |
| 0A | Removal beyond the area of the X |

X-Ray Diffraction: All x-ray diffraction (XRD) analysis were completed using a Panalytical Empyrean x-ray diffractometer with Bragg-Brentano geometry and Cu-Kalpha radiation. Lattice parameters were determined by full pattern refinement using the software Topas (bruker AXS). The lattice parameters of both palladium and gold standards were measured along with background measurements when applicable. Topas was used to calculate the lattice parameters of the standards and the alloy coating. Vegard's law states that the relationship between the lattice parameters of an alloy and its elemental constituents is linear and can therefore be used to calculate the alloy composition. Using this relationship, the composition of the coating can be calculated using equation 1.

$$\% \, Au - Pd = \frac{\text{Å alloy} - \text{Å}Pd}{\text{Å}Au - \text{Å}Pd} \times 100 \quad (1)$$

Planar substrates: Initially a Pd on stainless steel and a Au on stainless steel coupon were measured to check the method. The measured lattice parameter for the palladium standard was 3.8496±0.00033 Å and the measured lattice parameter for the gold standard was 4.0802±0.00013 Å. Both standards were prepared and plated as outlined in the mythology discussed above using unmodified commercial Pd and Au plating solutions.

Tubular substrates: Initially a 500 nm Pd on vanadium standard was measured to check the method. The measured Pd lattice parameter was 3.8495761±0.0003254 Å. The theoretical lattice parameter for Pd is 3.8907 Å ("Technical data for Palladium," n.d.). This value falls outside the error of the measured value of the Pd on V sample. As this analysis technique is the difference in lattice parameter of each pure substance, the data will be representative of the true value for the alloy if the standards are prepared on vanadium tube.

Permeability: Once the membranes surface has been analysed, the final test of the coated layer its permeability by mounting the tube in a membrane testing reactor as shown in FIG. 3 and described previously. As pictured in FIG. 3, $H_2$ was introduced into the left hand end of the reactor. The tube coming straight out of the right hand side was the permeate line. This was measured for flux calculations. The tube coming out perpendicular to the reactor, on the right side, was the raffinate line. This was the waste line for the gas that does not pass through the membrane.

The reactor was then placed inside a furnace. A controlled flow of $H_2$ was fed to the reactor and which was measured using a mass flow meter. A gas chromatograph can be used to measure the purity of any desired stream. The membrane was heated in the furnace to 325 to 350° C. under a continuous flow of nitrogen. Once stabilised, hydrogen was introduced, the nitrogen was removed, the reactor was pressurised and the flow of $H_2$ through the membrane was measured. This was continuously measured until the permeation was stable over several hours, usually for around 24 hours.

Commercial Plating Solutions

Plating: The first alloy trial was completed mixing two commercially procured plating solutions. 75 mL of Metakem Palladium—AS-3 was mixed with 25 mL of Metakem Gold—SF-Bath. The solution composition was 62.5 w/w % Au—Pd and heated to 54° C. A stainless steel coupon was prepared and plated as outlined in the methodology discussed above. Two samples were prepared, designated PGA_009 and PGA_010.

After approximately 2 hours bath, it was noticed that the plating solution turned brown in colour, caused by a precipitate forming. This was allowed to settle overnight and the solution was decanted off the top. The remaining solution was dried, dispersed in isopropanol, ground, applied to a glass slide and dried for XRD analysis.

This trial was then repeated, reducing the amount of Au added. 95 mL of Metakem Palladium—AS-3 was mixed with 5 mL of Metakem Gold—SF-Bath. The solution composition was 20.8 w/w % Au—Pd and was heated to 54° C. The stainless steel coupon was prepared and plated as outlined in the methodology discussed above. At this lower gold concentration, the solution was even less stable, with precipitates forming within 20 minutes. Three samples were prepared, designated PGA_015 to PGA_017.

Visual Analysis: Table 2 shows the visual observations and adhesion test results. Importantly, it shows that as the current density increases from samples PGA_015 to PGA_017, the adhesion of the plated layer decreases.

TABLE 2

Visual observations and adhesion test outcomes

| Sample ID | Plating Current (A/cm$^2$) | Appearance | Colour | Peel test grade |
|---|---|---|---|---|
| PGA_009 | 0.010 | Dull | Dark Grey | 4A |
| PGA_010 | 0.010 | Dull | Dark Grey | 4A |
| PGA_015 | 0.012 | Dull | Dark Grey | 5A |
| PGA_016 | 0.015 | Dull | Dark Grey | 4A |
| PGA_017 | 0.025 | Dull | Dark Grey | 3A |

X-ray Diffraction (XRD): The results shown in table 3 were analysed by XRD as discussed above. As shown in table 3, samples PGA_009 and PGA_010 were both a ~70 at % Au—Pd alloy. It also shows that samples PGA_015 to 017 were between 20 and 30 at % Au—Pd alloys. While the solution was very unstable, this shows that it is possible to co-deposit an Au—Pd alloy layer, in a single step and that the alloy composition varies with the proportion of Au to Pd in the plating solution.

TABLE 3

Results from XRD Analysis

| Sample ID | Measured Lattice Parameter (Å) | Au Lattice Parameter (Å) | Pd Lattice Parameter (Å) | % Au—Pd | Error (Å) |
|---|---|---|---|---|---|
| PGA_009 | 4.011988 | 4.080165 | 3.849576 | 70.4 | 0.000258 |
| PGA_010 | 4.011695 | 4.080165 | 3.849576 | 70.3 | 0.000273 |
| PGA_015 | 3.915338 | 4.080165 | 3.849576 | 28.5 | 0.000653 |
| PGA_016 | 3.897389 | 4.080165 | 3.849576 | 20.7 | 0.000564 |
| PGA_017 | 3.895478 | 4.080165 | 3.849576 | 19.9 | 0.000416 |

Figure 15:
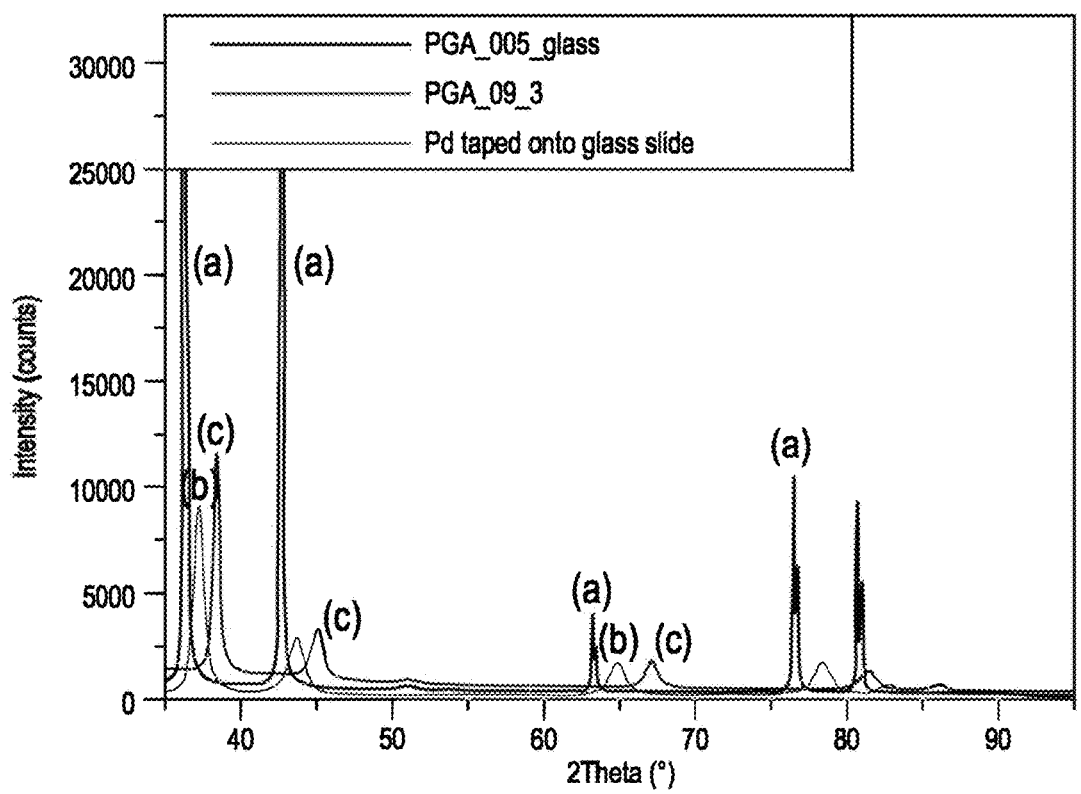
FIG. 15 provides a comparison of XRD spectra of (a) a Au standard on a glass slide; (b) a Pd standard on a glass slide in brown; and (c) sample PGA_009 (a Pd—Au plated alloy).

FIG. 15 shows the XRD spectra of a Au standard on a glass slide in blue, a Pd standard on a glass slide in brown and sample PGA_009 (a plated alloy) in green. This shows that the peak shapes and spacing are similar for each individual spectrum, but have varying 2 theta values. As the gold content of the alloy increases, 2 theta values for the peaks shift towards the values of pure Au. It is noted that these samples were prepared by plating onto a metal substrate then delaminating the plated layer and adhering it to a flat substrate for the XRD measurement. In this case the substrate surface was manipulated to prevent good adhesion, thereby allowing the layer to be removed.

FIG. 16 shows the XRD spectrum of the unknown precipitate that formed when mixing two commercial plating solutions. This has the spectrum of a gold standard over-laid. This shows a good match, with no peaks unaccounted for, indicating that the precipitate formed was pure Au. This was likely caused by in-situ redox reactions between those additives in the Metakem Pd solution and the Metakem Au solution. As the Metakem Pd solution is sulphite based, it is likely that the oxidation of sulfite to sulfate occurred, causing the reduction of Au+ ions to Au metal. This is more apparent as the solution was made two days before plating, yet the precipitate formed within hours. This experiment shows that while it is possible to plate a Au—Pd alloy from solution, the gold needs to be present in a more stable form.

Plating Au—Pd on Copper

Plating: In this trial 99.99% $KAu(CN)_2$ (procured from Sigma Aldrich) was added to a Legor Pd plating solution. The plating solution was 12.3 w/w % Au—Pd—bath a in table 4. As hull cell was set up and a 1.6×125×80 mm copper panel was prepared and plated as outlined in the methodology discussed above.

Figure 17:
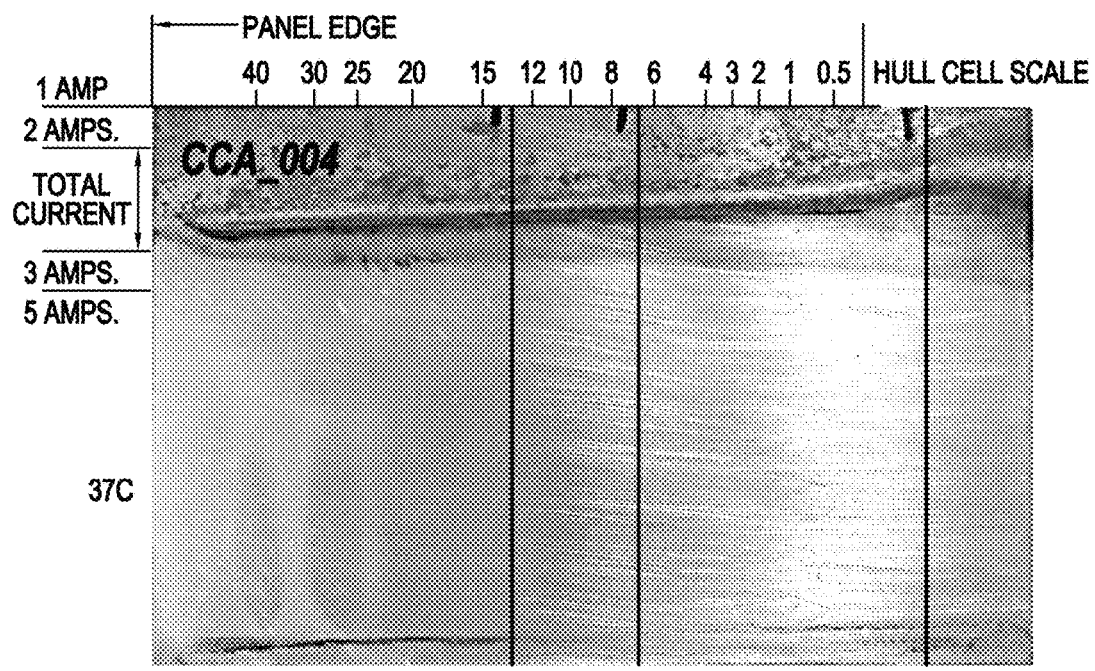
FIG. 17 shows two plated copper substrates, plated with a Pd—Au alloy using the hull cell shown in FIG. 9.
Figure 17:
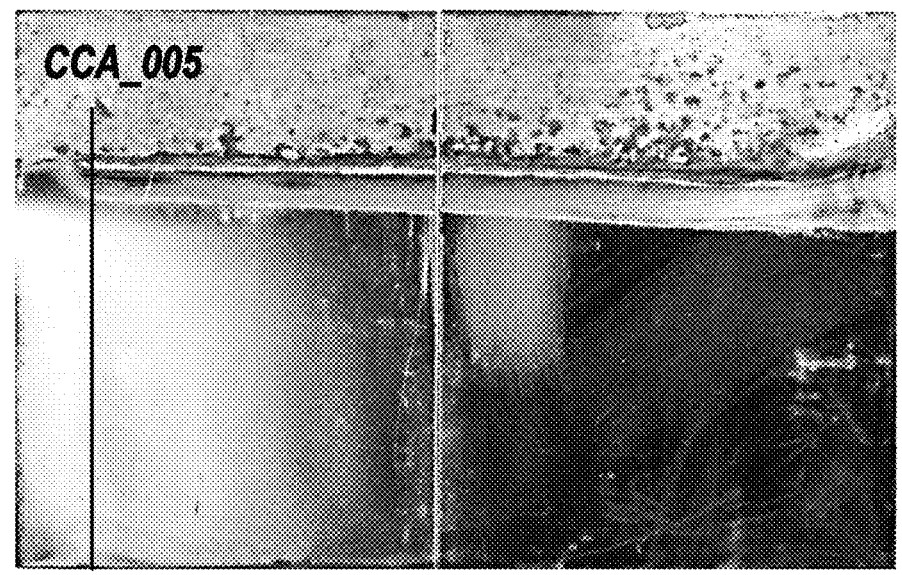

Analysis: FIG. 17 shows two plated copper substrates, plated in the hull cell. The upper sample CCA_004, was plated at 37° C. and the lower sample CCA_005, was plated at 55° C. It can been seen on sample CCA_004 that at 37° C., plating was soft (silver) across the whole panel, indicating that current density has little effect on surface finish at 37° C. However on sample CCA_005, at 55° C., the coating goes from soft to hard (silver to black) from left to right on the coupon. At this higher temperature, we are able to tailor the surface finish properties by changing current densities.

XRD analysis was performed at three intervals across sample CCA_004, indicated by vertical lines in FIG. 17. From left to right the measured lattice parameters were 3.911±0.001, 3.913±0.001 and 3.912±0.001 Å. This indicates that current density has not affected the alloy composition. By undertaking a Rietveld refinement of the XRD data, a qualitative measure of layer thickness can be attained. From left to right the relative wt % of copper was 41.00, 36.12 and 30.00%, indicating that the thickness of the plated layer increases with current density, which is consistent with literature. Sample CCA_005 had a lattice parameter of 3.919 Å, indicating slightly more gold in the alloy at the higher temperature. This was measured at the blue line on FIG. 18. It also had a relative thickness to copper of 73.8%, indicating that temperature has a much more significant effect on plating speed then current density.

Figure 18:
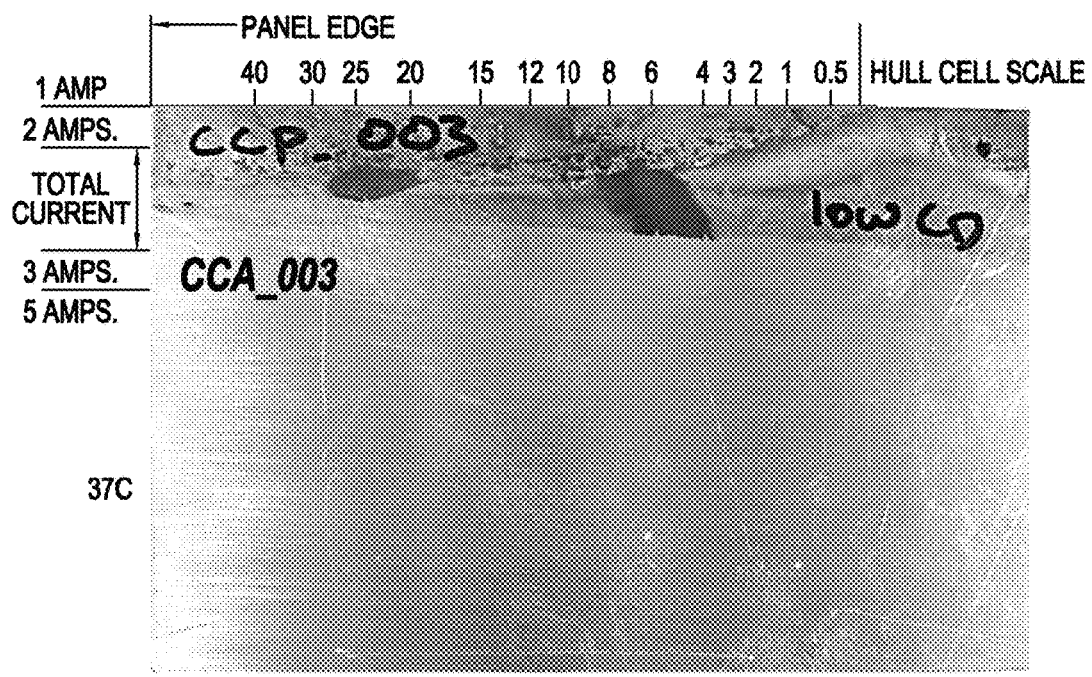
FIG. 18 shows a copper hull cell panel, plated at 49° C. with Legor Pd plating solution.

FIG. 18 shows a copper hull cell panel, plated at 49° C. with Legor Pd plating solution. Sample CCA_003 shows little to no variation in surface finish across that entire test panel. Sample CCA_005 was plated at similar temperatures with an Au—Pd alloy, shown in FIG. 18, but shows large variation in surface finish across the test panel. This indicates that at under the above conditions, the Au salt is playing a major role in determining the surface finish.

Plating Au—Pd on Vanadium

Plating: The inside of the membrane was plated first, as it was not possible to isolate the outside surface of the tube from the HF during etching in the experimental setup used for these trials. The inside of the tube of trials samples labelled PGA_033 to PGA_052 were plated for 7.5 minutes, at 4.43E-02 A/cm$^3$ with Metakem Pd plating solution. This provided a 500 nm thick Pd layer to catalyse the recombination of the hydrogen ions. The outside surface was prepared and plated as outlined in the methodology discussed above. Both temperature and rotation speed was varied throughout trails, shown in table 5. The bath composition was also varied. The tested solutions are shown in table 4.

TABLE 4

Plating bath compositions

| Bath | Mass KAu(CN)$_2$ (g) | Mass Au (g) | Volume Legor Pd (mL) | Mass Pd (g) | Au—Pd (w/w %) |
|---|---|---|---|---|---|
| a | 0.312 | 0.213 | 870 | 1.74 | 12.3 |
| b | 0.175 | 0.120 | 200 | 0.4 | 29.9 |
| c | 0.330 | 0.226 | 500 | 1 | 22.6 |
| d | 0.139 | 0.095 | 500 | 1 | 9.5 |

TABLE 5

Plating bath conditions

| Tube ID | Bath | Temperature (° C.) | Rotation Speed (RPM) | Current Density (A/cm$^2$) | pH |
|---|---|---|---|---|---|
| PGA_038 | b | 30 | 50 | 5.51E-02 | >8.5 |
| PGA_043 | c | 40 | 50 | 8.27E-02 | 8.48 |
| PGA_044 | c | 40 | 50 | 1.65E-01 | >8.5 |
| PGA_045 | c | 40 | 50 | 8.27E-02 | 8.48 |
| PGA_046 | c | 29 | 50 | 4.14E-02 | >8.5 |
| PGA_047 | c | 28 | 50 | 4.14E-02 | 8.52 |
| PGA_048 | c | 48 | 50 | 4.14E-02 | 8.54 |
| PGA_049 | c | 47 | 100 | 4.14E-02 | 8.62 |
| PGA_050 | d | 30 | 50 | 4.55E-02 | 8.64 |
| PGA_051 | d | 47 | 50 | 4.14E-02 | 8.43 |
| PGA_052 | d | 47 | 100 | 4.14E-02 | 8.45 |

Table 5 shows the plating bath conditions analysed. The baths pH remained relatively constant, at ~8.5. Trails with varying pH were not conducted due to the increased risk of hydrogen cyanide production associated with cyanide based salts in the presence of acids. Once an appropriate current density was determine, in runs producing samples PGA_043 to PGA_046, this was used for all but one trial. For baths c and d, two temperatures and two rotation speeds were analysed for their effect on alloy composition and surface properties.

Figure 19:
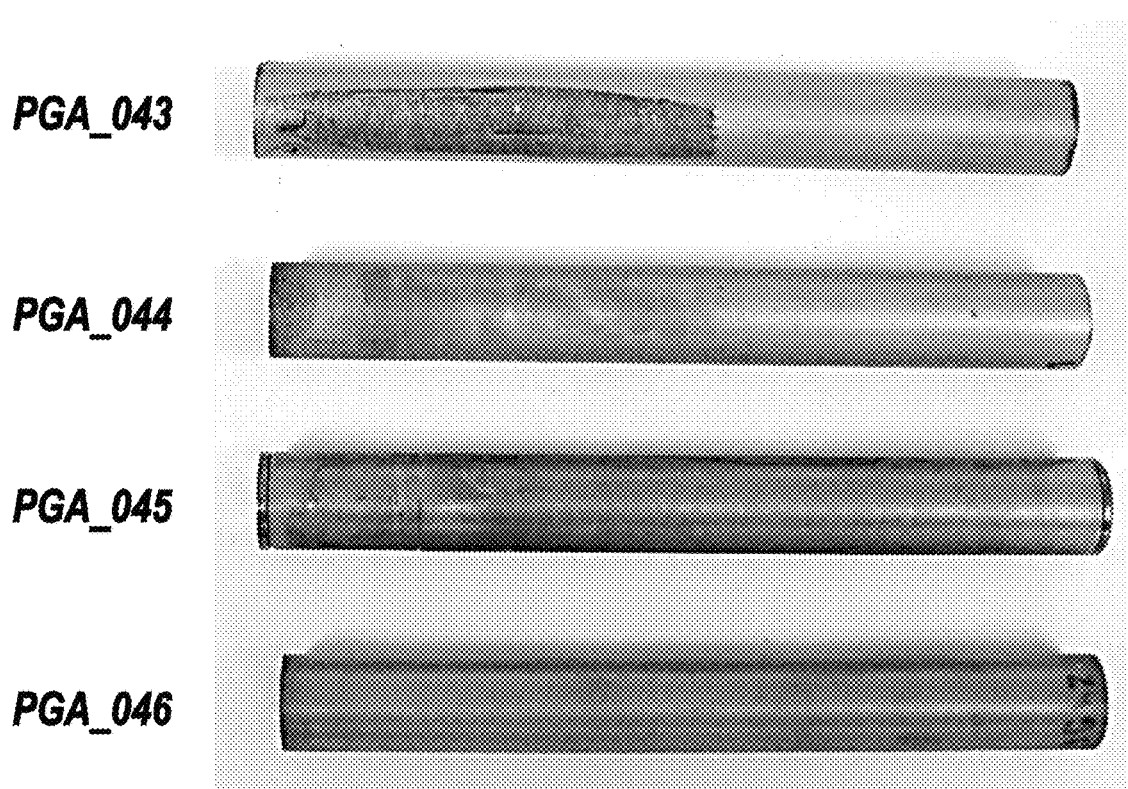
FIG. 19 shows four experimental tubes samples PGA_043 to PGA_046 (from top to bottom) plated in bath c, outlined in table 4. Note the dark region is where the layer has been delaminated using the sticky tape test.

Visual Analysis: FIG. 19 shows four tubes, PGA_043 to PGA_046 (from top to bottom). These tubes were all plated in bath c, shown in table 4. All 4 tubes were annealed at 350° C. for ~18 hours and permeations tests had been performed. As shown in FIG. 19, samples PGA_043, PGA_044 and to a small extent sample PGA_045, show purple smears, indicating that there was exposed vanadium when annealed. The plating was therefore incomplete/patchy. As the only variable changed in these four tests was the current density, it can be concluded that the most effective current density under these bath conditions was 4.1E-02 A/cm$^2$.

TABLE 6

Visual observations and adhesion test outcomes

| Sample ID | Appearance | Colour | Peel test grade |
|---|---|---|---|
| PGA_038 | Slightly dull | Light Grey | 4A |
| PGA_043 | Slightly dull | Light Grey | 5A |
| PGA_044 | Slightly dull | Light Grey | 2A |
| PGA_045 | Slightly dull | Light Grey | 4A |
| PGA_046 | Slightly shiny | Grey | 5A |

Table 6 shows the visual analysis of samples PGA_038, and PGA_043-PGA_049. Adhesion tests were conducted on samples as outlined above. They were completed after the samples had been annealed at 350° C. for ~18 hours and permeations tests had been performed. Table 6 shows the results from the adhesion tests. As the plating current increased the adhesion decreased. PGA_043 and PGA_046 were both graded 5A. As PGA_046 also had the best surface finish and alloy covering, 4.14E-02 A/cm$^2$ was deemed to be the most appropriate current density for further trials.

Figure 20:
FIG. 20 shows three experimental tubes samples PGA_047 to PGA_048 which were plated in bath c, outlined in table 4.
Figure 20:
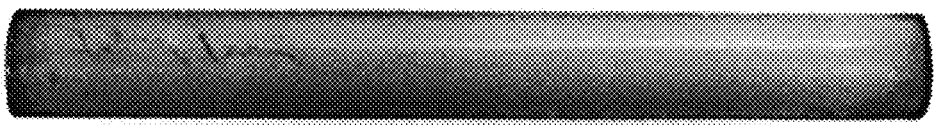
Figure 20:
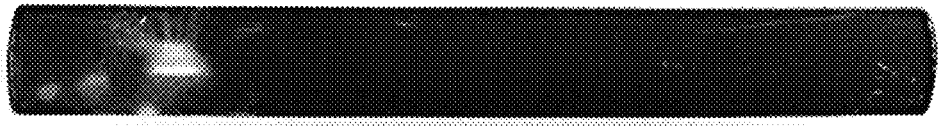

FIG. 20 shows three tubes, PGA_047 to 048 (from top to bottom). These tubes were all plated in bath c, shown in table 4. It can be seen that increasing the temperature from 28° C. to 48° C. (PGA_047 to PGA_048) that the surface finish becomes darker, rougher and duller, indicating a higher surface area coating. The hull cell panels were used to determine the conditions where the high and low surface area plating would occur as it is important that both are tested for their permeability.

TABLE 7

Visual observations and adhesion test outcomes

| Sample ID | Appearance | Colour | Peel test grade |
|---|---|---|---|
| PGA_047 | Shiny | Light Grey | 5A |
| PGA_048 | Dull | Dark Grey | 3A |
| PGA_049 | Dull | Black | 3A |

Table 7 shows the visual analysis of samples PGA_47 to PGA_049. Similarly to the hull cell tests, as the temperature of the plating bath was increased from 28° C. (PGA_047) to 48° C. (PGA_048 and PGA_049) the surface finish became both dull and darker. Increasing the agitation of the solution by increasing the rotation speed, also resulted in a darker, rougher surface finish. Adhesion tests were conducted on samples PGA_47-PGA_049 as outline above after the samples had been annealed at 350° C. for ~18 hours and permeations tests had been performed. Table 7 shows the adhesion test results. As the temperature of the bath increased, the surface adhesion decreased.

Figure 21:
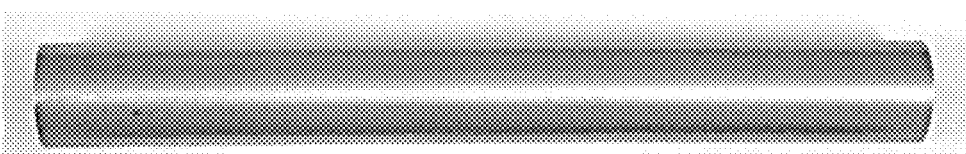
FIG. 21 shows three experimental tubes samples PGA_050 to PGA_052 which were all plated in bath d, outline in table 4.
Figure 21:
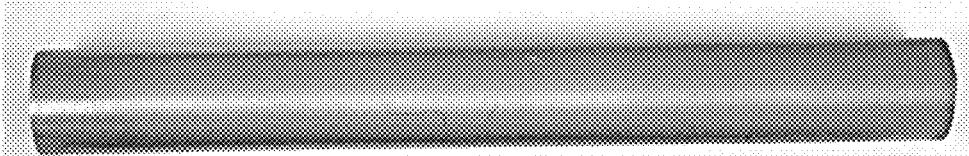
Figure 21:
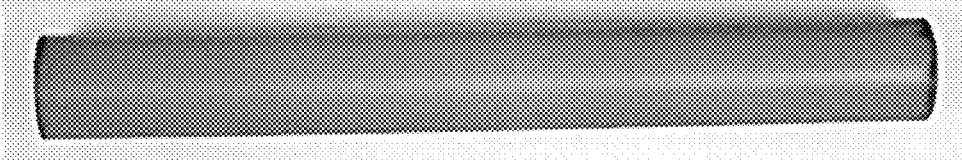

FIG. 21 shows three tubes samples PGA_050 to PGA_052 (from top to bottom). These tubes were all plated in bath d, shown in table 4. It can be seen that increasing the temperature from 28° C. to 48° C. (PGA_047-PGA_048) that the surface finish becomes darker and duller, indicating a higher surface area coating. The same sets of trials were completed on PGA_47 to PGA_049 and PGA_050 to 052. The variable that changed was the ratio of Au to Pd in the plating solution. When comparing FIGS. 20 and 21, the trend of increasing surface roughness and darkness was the same, however in PGA_47 to PGA_049, where the Au content was higher in the plating solution, the change was much more dramatic. This is consistent with the hull cell results, where it is hypothesised that the Au is the main contributor to the surface finish. The degree of agitation was also consistent between both trials, increasing the speed of rotation resulted in a darker, rougher plaiting.

TABLE 8

Visual observations and adhesion test outcomes

| Sample ID | Appearance | Colour | Peel test grade |
|---|---|---|---|
| PGA_050 | Shiny | Light Grey | 5A |
| PGA_051 | Dull | Light Grey | 5A |
| PGA_052 | Dull | Slightly dark Grey | 5A |

Table 8 shows the visual analysis of samples PGA_50 to PGA_052. Adhesion tests were conducted on the samples following the methodology outlined above. They were done after the samples had been annealed at 350° C. for ~18 hours and permeations tests had been performed. Table 8 shows the adhesion test results. As the temperature of the bath increased, the surface adhesion was unaffected. This indicated that the Au the most significant effects on the adhesion as well as the surface finish.

X-ray Diffraction (XRD): The results shown in table 9 were analysed by XRD following the methodology described previously. The error equates to less than ±0.5% of the Au—Pd alloy composition for samples PGA_043 to PGA_052. In comparing table 9 and table 5, there is little effect on temperature and agitation on the final alloy composition. The XRD results of samples PGA_043 to PGA_046 show that there is no noticeable effect of current density, outside of error, on the plated alloy composition. This is consistent with the hull cell tests outline above.

TABLE 9

Lattice parameters of deposited layers determined by Rietveld refinement of x-ray diffraction measurements

| Sample ID | Measured Lattice Parameter (Å) | Au Lattice Parameter (Å) | Pd Lattice Parameter (Å) | % Au—Pd | Error (Å) |
|---|---|---|---|---|---|
| PGA_038 | 3.9422 | 4.0802 | 3.8496 | 40.2 | |
| PGA_043 | 3.9222 | 4.0802 | 3.8496 | 31.5 | 5.14E-04 |
| PGA_044 | 3.9202 | 4.0802 | 3.8496 | 30.6 | 4.44E-04 |
| PGA_045 | 3.9172 | 4.0802 | 3.8496 | 29.3 | 5.61E-04 |
| PGA_046 | 3.9164 | 4.0802 | 3.8496 | 29.0 | 5.60E-04 |
| PGA_047 | 3.9197 | 4.0802 | 3.8496 | 30.4 | 6.41E-04 |
| PGA_048 | 3.9194 | 4.0802 | 3.8496 | 30.3 | 6.49E-04 |
| PGA_049 | 3.9239 | 4.0802 | 3.8496 | 32.2 | 5.43E-04 |

TABLE 9-continued

Lattice parameters of deposited layers determined by Rietveld refinement of x-ray diffraction measurements

| Sample ID | Measured Lattice Parameter (Å) | Au Lattice Parameter (Å) | Pd Lattice Parameter (Å) | % Au—Pd | Error (Å) |
|---|---|---|---|---|---|
| PGA_050 | 3.9095 | 4.0802 | 3.8496 | 26.0 | 1.43E-04 |
| PGA_051 | 3.9067 | 4.0802 | 3.8496 | 24.8 | 2.98E-04 |
| PGA_052 | 3.9081 | 4.0802 | 3.8496 | 25.4 | 2.99E-04 |

Permeability: Table 10 shows the $H_2$ permeability results from permeability experiments as outlined above conducted on the samples listed in Table 10. Sample tubes PGA_047 to PGA_049 are ~30 at % Au—Pd alloys and PGA_050 to PGA_052 are ~25 at % Au—Pd alloys (see table 9). The 30 at % Au—Pd alloys exhibited permeabilities almost two times higher than the 25 at % Au—Pd alloys. Table 10 also shows that the $H_2$ permeability increases with higher surface area, rough surface finishes.

TABLE 10

Permeability results

| Sample ID | Temperature (° C.) | Pressure (bar) | Peak Permeability in $H_2$ (mol/m/s/Pa$^{0.5}$) | Steady State $H_2$ Permeability in 20 ppm $H_2S$ (mol/m/s/Pa$^{0.5}$) after one hour |
|---|---|---|---|---|
| PGA_047 | 325 | 4.44 | 1.39E-07 | 2.22E-08 |
| PGA_048 | 325 | 3.97 | 2.07E-07 | n/a |
| PGA_049 | 326 | 4.53 | 1.80E-07 | 4.82E-08 |
| PGA_050 | 326 | 4.75 | 1.04E-07 | 3.26E-08 |
| PGA_051 | 326 | 4.75 | 1.23E-07 | 4.34E-08 |
| PGA_052 | 325 | 4.91 | 1.27E-07 | 5.11E-08 |

The 30 at % Au—Pd alloys also exhibited higher peak permeabilities in $H_2$ than previously produced Pd coated vanadium membranes, which had achieved permeabilities of 1.5 E-07 mol/m/s/Pa$^{0.5}$ at 400° C. and 7.9 E-08 mol/m/s/Pa$^{0.5}$ at 350° C. They also achieved higher permeabilities then Pd on ceramic membranes, reported in previous studies of having permeations up to 1.7 E-08 mol/m/s/Pa$^{0.5}$ at 400° C. and 6.5 E-09 mol/m/s/Pa$^{0.5}$ at 400° C. and 4.2 E-09 mol/m/s/Pa$^{0.5}$ at 350° C.

Ceramic membranes with a 5.5 µm thick, sputtered, 10 mass % Au—Pd alloy coating have reported permeabilities of up to 1.82E-08 mol/m/s/Pa$^{0.5}$ at 400° C. Similar membranes with 15 at % Au—Pd coatings have reported permeabilities up to 7.6 E-09 mol/m/s/Pa$^{0.5}$ at 400° C. (Peters et al., 2012). With 30 at % Au—Pd on vanadium membranes achieving permeabilities up to 2.07E-07 mol/m/s/Pa$^{0.5}$ at 325° C., electrodeposition of Au—Pd alloys onto vanadium could be a competitive technology.

Additional Plating Au—Pd on Vanadium

As above, the inside of the membrane was plated first, as it was not possible to isolate the outside surface of the tube from the HF during etching in the experimental setup used for these trials. The inside of the tube of trials samples labelled PGA_054 to PGA_061 were plated for 7.5 minutes, at 4.43E-02 A/cm³ with Metakem Pd plating solution. This provided a 500 nm thick Pd layer to catalyse the recombination of the hydrogen ions. The outside surface was prepared and plated as outlined in the methodology discussed above. The plating conditions are outlined in table 11:

TABLE 11

Plating bath conditions

| Sample | Precurser solution | Au—Pd in solution [wt/wt %] | Plating conditions | Au—Pd in Alloy [at %] |
|---|---|---|---|---|
| PGA 54 | Metakem | 10.1 | 46° C., 0.1 A, 50 rpm | 24 |
| PGA 56 | Metakem | 5.1 | 48° C., 0.1 A, 50 rpm | 18.5 |
| PGA 57 | Metakem | 20.2 | 48° C., 0.1 A, 50 rpm | 31.8 |
| PGA 58 | Metakem | 20.2 | 47° C., 0.1 A, 50 rpm | 28.8 |
| PGA 61 | Metakem | 5.1 | 46° C., 0.1 A, 50 rpm | 19 |
| #253C | Metakem | 0 |  | 0 |

Permeability: Table 12 shows the $H_2$ permeability results from permeability experiments as outlined above conducted on the samples PGA_054 to PGA_061 outlined in Table 11. The peak permeability under $H_2$ was found to be comparable to results for samples PGA_47 to PGA_52 (see table 10), with comparable steady state permeability in 20 ppm $H_2S$ (see tables 10 and 12).

$H_2$ permeability was also measured for a palladium standard coated tube, with no Au content in the coating designated sample #253c to show the comparative effect of $H_2S$ on a pure palladium coated membrane. It is noted that the steady state permeability with a gas flow containing 20 ppm $H_2S$ is significantly less that the Au—Pd coated samples. In fact, it was found that the $H_2S$ content continuously decreased, due to build up of a $Pd_4S$ layer, with that layer thickness increasing over time, decreasing $H_2$ permeability.

TABLE 12

Permeability results

| Sample | Peak Permeability under $H_2$ [mol/m/s/Pa$^{0.5}$] | Permeability test temperature [° C.] | Steady State $H_2$ Permeability in 20 ppm $H_2S$ [mol/m/s/Pa$^{0.5}$] |
|---|---|---|---|
| PGA 54 | 1.01E−07 | 320 | 3.73E−08 |
| PGA 56 | 1.00E−07 | 325 | 3.60E−08 |
| PGA 57 | 9.28E−08 | 325 | 1.79E−08 |
| PGA 58 | 7.03E−08 | 327 | 1.99E−08 |
| PGA 61 | 1.18E−07 | 320 | n/a |
| #253C | 1.48E−07 | 330 | 8.71E−09 |

Conclusions

A stable solution was developed for the electrodeposition of Au—Pd alloys of desired composition, 20 to 30 at % Au—Pd. This was tailored by adjusting the Pd—Au ratio in the solution and quantified by direct measurement of the plated tube by x-ray diffraction (XRD) analysis. This enables the non-destructive analysis of tubes post plating before installing into the reactor.

Example 3

High Surface Area Plating

The rougher the surface area, the more the surface area is capturing and/or reflecting the light at different angles. Surface texture or roughness is important as it provides more surface area. $H_2$ permeability increases with higher surface area, rough surface finishes. The shade or light reflectivity of provides an indication of the roughness of the Pd—Au plated coating. The lightness (shade/light reflectivity) of four samples were measured to correlate this with surface roughness.

A hull cell apparatus was set up following the methodology described in Example 2. The coupon was prepared following the methodology described in Example 2—Substrate Preparation with the addition of a 10 s bright dip in 10% $H_2SO_4$, electrolytic clean in Legor SGR1P cleaner (100 g/L) at 8.6 V for 30 s and a deionised water rinse. The coupon was the attached to the high current density end of the hull cell and plated for 5 minutes with no agitation in a $KAu(CN)_2$/Legor Pd plating solution mix.

The surface morphology of the plated alloy can be tailored by adjusting the solution temperature, current density during plating and level of agitation. Increasing the level of any of these parameters will increase the roughness and surface area of the alloy. It has also been shown that increasing the Au—Pd ratio in plating solution with increase the roughness of the alloy.

A current of 5 amps was applied the Hull Cell for SC_001 and SC_002 and 18 amps was applied for SC_003.

Surface roughness of each of the samples was indirectly measured by the lightness of the sample. The planar samples were measured using a Konica Minolta CR-400 Chroma Meter. This meter utilises a silicon photocell detector and a pulsed xenon lamp light source. Three different 8 mm areas were measured across the sample for one second and averaged to provide a mean lightness. The meter was calibrated on a white calibration plate, CR-A43.

It should be appreciated that lightness L is a parameter used to describe the lightness of a sample, where something with a lightness of 100 represents lightest of whites and a lightness of 0 represents the darkest of blacks.

The results are shown in Table 13:

TABLE 13

Lightness measurements of the samples

Figure 22:
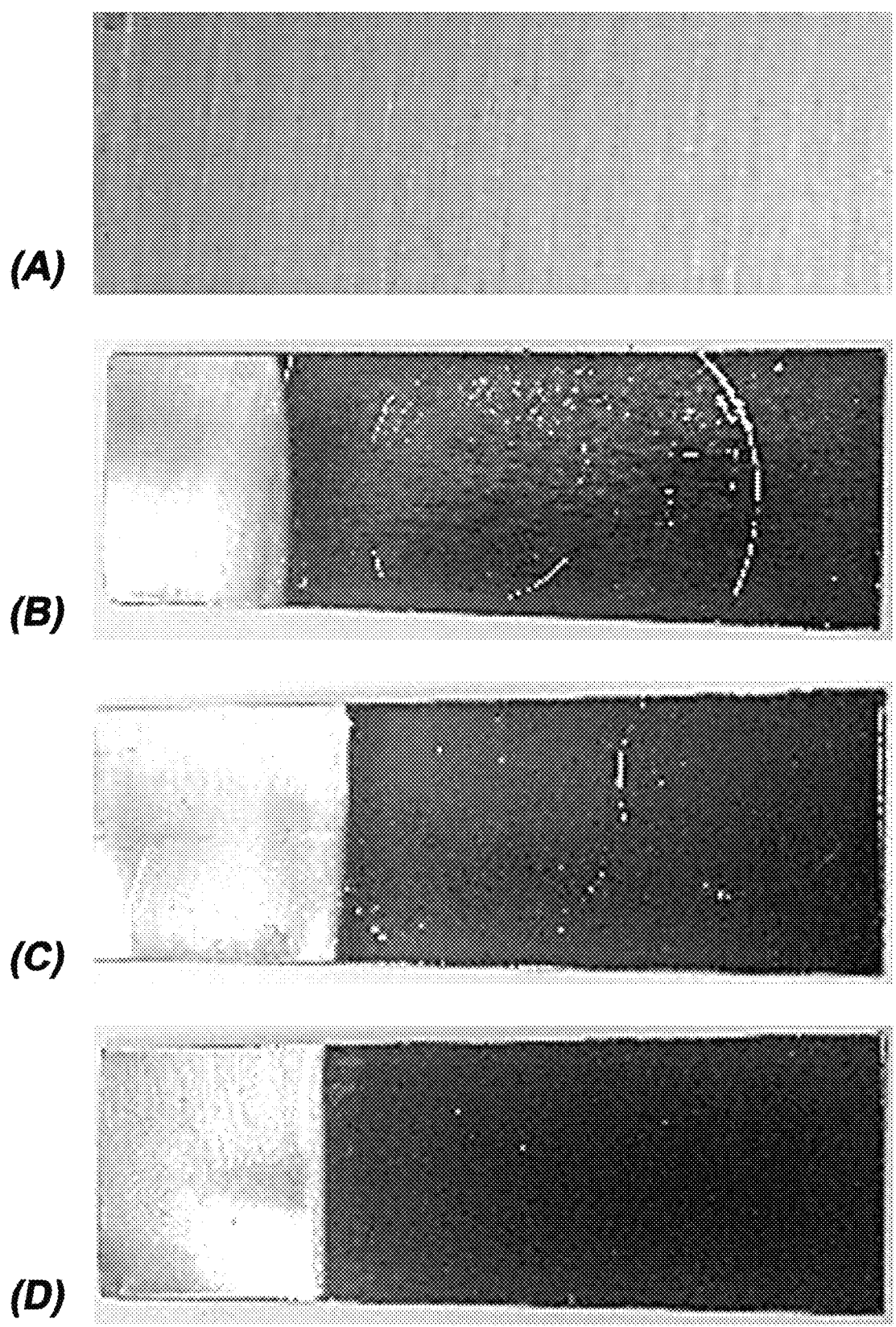
FIG. 22 shows four images of Pd—Au plated alloy on copper and stainless steel substrate, showing (A) Sample CC_001, Low surface area plating onto copper; (B) Sample SC_001, Low current, high surface area plating onto stainless steel; (C) Sample SC_002, Medium current, high surface area plating onto stainless steel; and (D) Sample SC_003, High current, high surface area plating onto stainless steel.

| Sample | Image | Lightness (L*) | Notes |
|---|---|---|---|
| CC__001 | Refer to FIG. 22(A) | 56.58 | Low surface area plating onto copper |
| SC__001 | Refer to FIG. 22(B) | 39.82 | Low current, high surface area plating onto stainless steel |
| SC__002 | Refer to FIG. 22(C) | 35.79 | Medium current, high surface area plating onto stainless steel |
| SC__003 | Refer to FIG. 22(D) | 26.01 | High current, high surface area plating onto stainless steel |

The following table (Table 14) shows that data from two different meters. Meter one is the Konica Meter as mentioned above. Meter 2 refers to a HunterLab MiniScan EZ using 45°/0° Geometry that measures both colour and the effect of texture. Importantly, when comparing the measured intensities as a percent difference from the lowest surface area alloy on stainless steel sample, the values between meters are comparable.

TABLE 14

Lightness measurements of the samples

| Sample | Lightness Meter 1 L* | % of SC 001 | Lightness Meter 2 L* | % of SC 001 |
|---|---|---|---|---|
| CP__007 | 56.58 |  | 72.8 |  |
| SC-001 | 39.82 | 100.0 | 42.9 | 100.0 |

TABLE 14-continued

Lightness measurements of the samples

| Sample | Lightness Meter 1 L* | % of SC 001 | Lightness Meter 2 L* | % of SC 001 |
|---|---|---|---|---|
| SC-002 | 35.79 | 89.9 | 38.2 | 89.1 |
| SC-003 | 26.01 | 65.3 | 27.3 | 63.7 |

The results show that the lower the measured lightness of the plated Pd—Au layer, the higher the surface roughness. Advantageously, $H_2$ permeability increases with higher surface area, rough surface finishes.

Example 4

Plated Morphology

Figure 23:
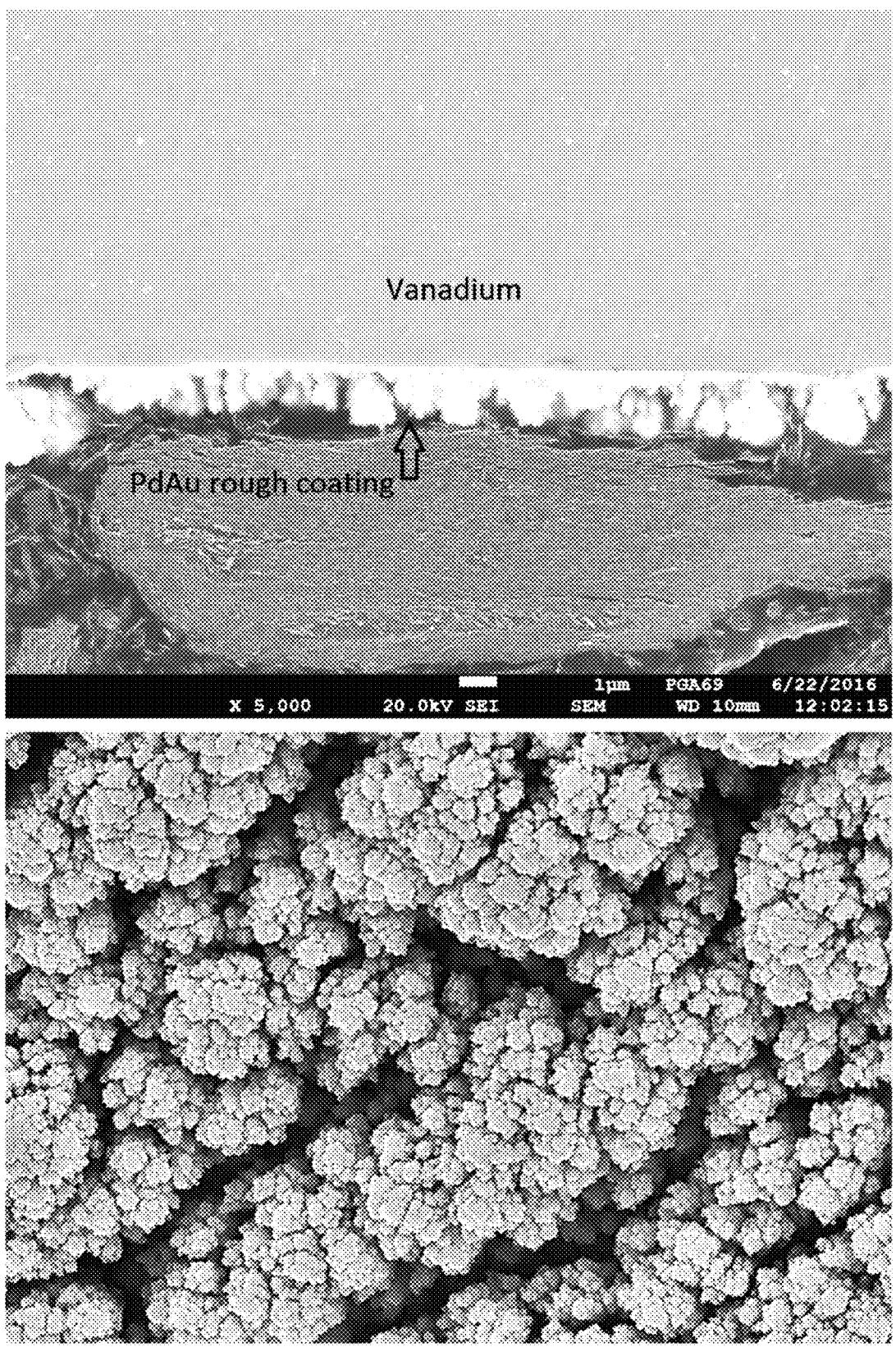
FIG. 23 provides two SEM images showing (A) cross-sectional view showing coating layers; and (B) top view of plated surface with Pd—Au plated alloy showing the bulbous or cauliflower morphology of the plated alloy.
Figure 24:
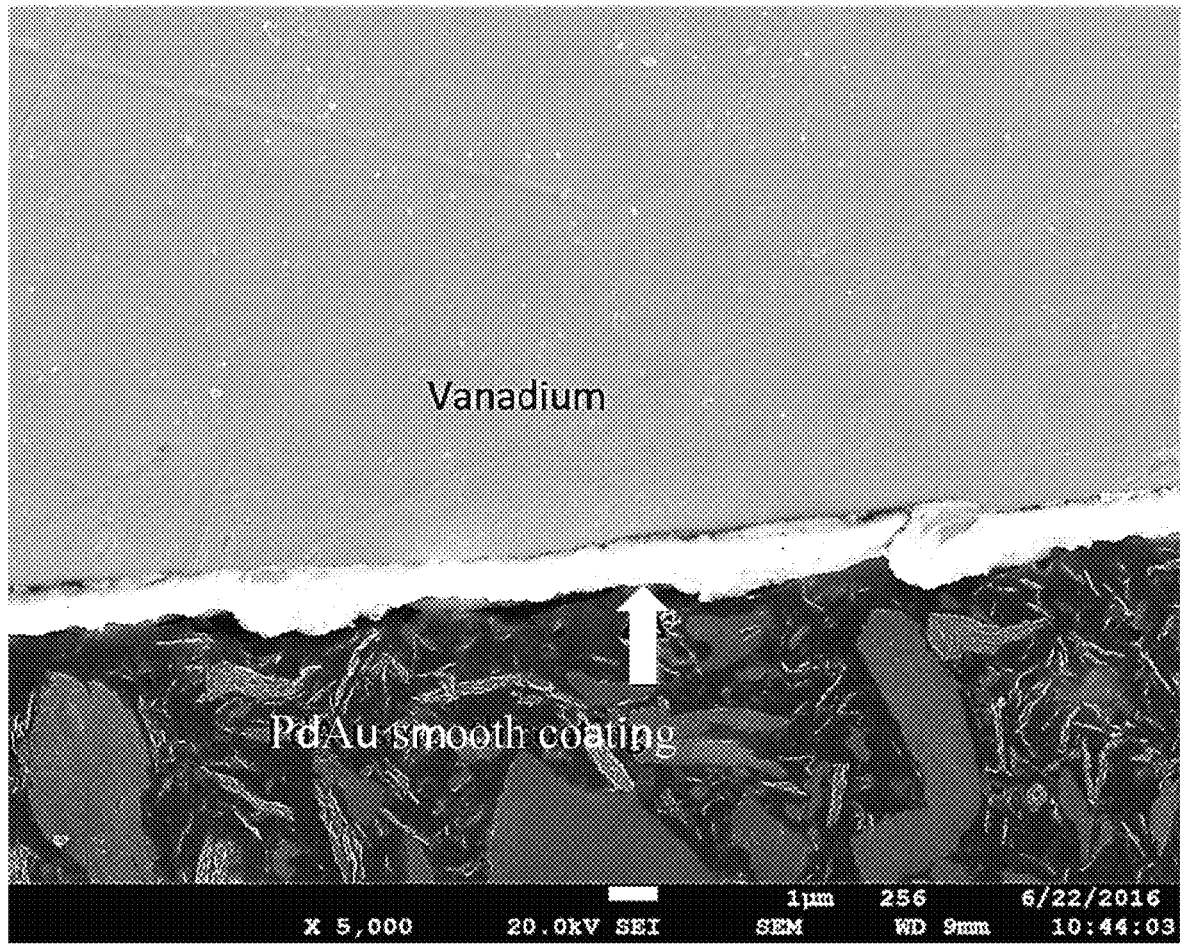
FIG. 24 provides an SEM image showing a plated surface with Pd—Au plated alloy showing a smooth layer morphology of the plated alloy.

SEM images of the plated surface of sample SC-001 and SC-003 were taken of the substrate after coating. The results are provided in FIG. 23 which shows the morphology of SC-003—the rough coating and FIG. 24 which shows the comparison with the smooth coating surface.

As shown in FIG. 23(A) and FIG. 23(B), the surface roughness of the applied Pd—Au plated alloy has an unexpected bulbous or cauliflower like morphology. This morphology advantageously adds surface texture enhancing $H_2$ permeability.

Applications

The primary application is as a coating for vanadium alloy tubes used as high-temperature, hydrogen-selective alloy membranes. These devices separate hydrogen from mixed gas streams which can also contain $H_2O$, $CO$, $CO_2$, $CH_4$ and $H_2S$. One particular application is use of hydrogen-selective alloy membranes for the production of $H_2$ and capture of $CO_2$ from gasified coal and biomass.

Other possible applications include a medium for storing high purity hydrogen gas for use in fuel cells for mobile or distributed electricity generation, the shielding of ionising radiation for aerospace applications, and as a thermal energy storage medium.

Those skilled in the art will appreciate that the invention described herein is susceptible to variations and modifications other than those specifically described. It is understood that the invention includes all such variations and modifications which fall within the spirit and scope of the present invention.

Where the terms "comprise", "comprises", "comprised" or "comprising" are used in this specification (including the claims) they are to be interpreted as specifying the presence of the stated features, integers, steps or components, but not precluding the presence of one or more other feature, integer, step, component or group thereof.

The invention claimed is:

1. A palladium-gold alloy coated vanadium or vanadium alloy-based gas separation membrane, comprising a palladium-gold alloy coating on a vanadium or vanadium alloy-based gas separation membrane, the coating having a thickness of between 100 nm and 5 microns and having a composition of from $Pd_{60}Au_{40}$ to $Pd_{95}Au_5$,
wherein the palladium-gold alloy coating has a bulbous and/or cauliflower shaped morphology having a lightness of less than 50, where a lightness of 100 represents the lightest of whites and a lightness of 0 represents the darkest of blacks, measured using a Chroma Meter; and
wherein the palladium-gold alloy coated vanadium or vanadium alloy-based gas separation membrane has a hydrogen permeability of at least $1 \times 10^{-7}$ mol/m/s/$Pa^{0.5}$ at temperatures between 325 to 350° C.

2. A palladium-gold alloy coated vanadium or vanadium alloy-based gas separation membrane according to claim 1, wherein the palladium-gold alloy coating has a lightness of less than 40 measured using a Chroma Meter.

3. A palladium-gold alloy coated vanadium or vanadium alloy-based gas separation membrane according to claim 1, wherein the palladium-gold alloy coating has a lightness of less than 35 measured using a Chroma Meter.

4. A palladium-gold alloy coated vanadium or vanadium alloy-based gas separation membrane according to claim 1, wherein the palladium-gold alloy coating has a lightness of less than 30 measured using a Chroma Meter.

5. A palladium-gold alloy coated vanadium or vanadium alloy-based gas separation membrane according to claim 1, wherein the palladium-gold alloy has a purity of at least 99.9%.

6. A palladium-gold alloy coated vanadium or vanadium alloy-based gas separation membrane according to claim 1, wherein the palladium-gold alloy has a purity of at least 99.99%.

7. A palladium-gold alloy coated vanadium or vanadium alloy-based gas separation membrane according to claim 1, wherein the palladium-gold alloy coating has a thickness of from 100 nm to 1 micron.

8. A palladium-gold alloy coated vanadium or vanadium alloy-based gas separation membrane according to claim 1, wherein the palladium-gold alloy coating has a thickness of from 200 to 500 nm.

9. A palladium-gold alloy coated vanadium or vanadium alloy-based gas separation membrane according to claim 1, wherein the palladium-gold alloy coating has a composition of from $Pd_{70}Au_{30}$ to $Pd_{90}Au_{10}$.

10. A palladium-gold alloy coated vanadium or vanadium alloy-based gas separation membrane according to claim 1, wherein the palladium-gold alloy coating has a composition of $Pd_{70}Au_{30}$ at %.

11. A palladium-gold alloy coated vanadium or vanadium alloy-based gas separation membrane according to claim 1, wherein the palladium-gold alloy coating has a 5A classification in accordance to ASTM D3359-97.

12. A palladium-gold alloy coated vanadium or vanadium alloy-based gas separation membrane according to claim 1, having a hydrogen permeability of 1 to $2.5 \times 10^{-7}$ mol/m/s/$Pa^{0.5}$ at temperatures between 325 to 350° C.

13. A palladium-gold alloy coated vanadium or vanadium alloy-based gas separation membrane according to claim 1, having a steady state $H_2$ permeability in 20 ppm $H_2S$ of 1 to $50 \times 10^{-8}$ mol/m/s/$Pa^{0.5}$ at temperatures between 325 to 350° C.

14. A palladium-gold alloy coated vanadium or vanadium alloy-based gas separation membrane according to claim 1, comprising a tubular gas separation membrane.

15. A palladium-gold alloy coated vanadium or vanadium alloy-based gas separation membrane according to claim 14, wherein the tubular gas separation membrane comprises a tube having an outer diameter of between 2 to 25 mm.

16. A method of preparing a palladium-gold alloy layer on a vanadium or vanadium alloy-based gas separation membrane comprising:
providing a nonporous vanadium or vanadium alloy-based gas separation membrane having a coating surface; and
electrodepositing said coating surface with an aqueous electroplating solution comprising a soluble palladium compound and a soluble gold complex, wherein the ratio of gold to palladium in the solution is from 5 to 40%, said electrodepositing is conducted for a period of time sufficient to simultaneously deposit both palladium and gold as a layer of palladium-gold alloy on the coating surface from the aqueous electroplating solution, wherein the said layer has a surface roughness; and wherein the surface roughness of said layer of palladium-gold alloy deposited on said coating surface is manipulated through at least one of: temperature of the aqueous electroplating solution, current density, or agitation of the aqueous electroplating solution, to create an outer surface of said layer of palladium-gold alloy having a lightness of less than 50 measured using a Chroma Meter, thereby producing a nonporous vanadium or vanadium alloy-based gas separation membrane coated with said palladium-gold alloy layer.

17. The method according to claim 16, wherein the palladium compound is palladium diamino dinitrite, palladium sulfate, palladium phosphate, a palladium organo sulfonate or a palladium organo phosphonate, and wherein the gold complex comprises potassium gold cyanide or sodium gold cyanide.

* * * * *